United States Patent
Suzuki et al.

(10) Patent No.: US 10,474,598 B2
(45) Date of Patent: Nov. 12, 2019

(54) MICROCOMPUTER

(71) Applicant: Renesas Electronics Corporation, Tokyo (JP)

(72) Inventors: Shinichi Suzuki, Tokyo (JP); Yuichi Takitsune, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/895,052

(22) Filed: Feb. 13, 2018

(65) Prior Publication Data

US 2018/0165231 A1   Jun. 14, 2018

Related U.S. Application Data

(63) Continuation of application No. 14/076,252, filed on Nov. 10, 2013, now Pat. No. 9,928,184.

(30) Foreign Application Priority Data

Nov. 26, 2012 (JP) ................. 2012-257304

(51) Int. Cl.
  *G06F 13/24* (2006.01)
  *G06F 7/00* (2006.01)
  (Continued)

(52) U.S. Cl.
  CPC .............. *G06F 13/24* (2013.01); *G06F 1/00* (2013.01); *G06F 7/00* (2013.01)

(58) Field of Classification Search
  CPC ..... G06F 7/00; G06F 1/00; G06F 5/00; G06F 13/24
  See application file for complete search history.

(56) References Cited

U.S. PATENT DOCUMENTS

| 4,188,665 A | 2/1980 | Nagel et al. |
| 5,594,631 A | 1/1997 | Katoozi et al. |

(Continued)

FOREIGN PATENT DOCUMENTS

| CN | 1998130 A | 7/2007 |
| CN | 101202017 A | 6/2008 |

(Continued)

OTHER PUBLICATIONS

Office Action dated Mar. 1, 2017, in Chinese Patent Application No. 201310603564X.

*Primary Examiner* — Getente A Yimer
(74) *Attorney, Agent, or Firm* — Shapiro, Gabor and Rosenberger, PLLC

(57) ABSTRACT

A microcomputer is provided for each of industrial apparatuses to synchronously control them and includes a CPU, a peripheral module, and a communication interface. The peripheral module controls an external apparatus based on a specified control parameter. The communication interface includes a time register that is synchronized with the other apparatuses in time series. The communication interface issues a CPU interrupt and a peripheral module interrupt to the CPU and the peripheral module, respectively, if a successively settled correction time matches the time register. In response to the peripheral module interrupt, the peripheral module changes the control parameter from a current value to an update value. In response to the CPU interrupt, the CPU starts an update program to calculate the next update value for the control parameter and writes the calculated value to the peripheral module.

13 Claims, 18 Drawing Sheets

(51) Int. Cl.
*G05F 1/00* (2006.01)
*G06F 1/00* (2006.01)

(56) References Cited

U.S. PATENT DOCUMENTS

| | | | |
|---|---|---|---|
| 6,249,860 B1 | 6/2001 | Boutaud et al. | |
| 7,064,513 B2 | 6/2006 | Fenley | |
| 7,136,106 B1 | 11/2006 | Shinohara et al. | |
| 7,356,617 B2 | 4/2008 | Suzuki et al. | |
| 7,617,386 B2 | 11/2009 | May et al. | |
| 8,749,470 B2 | 6/2014 | Furihata et al. | |
| 2002/0133645 A1* | 9/2002 | Ku | G06F 13/28 710/22 |
| 2003/0088724 A1* | 5/2003 | Itoh | G06F 13/24 710/262 |
| 2008/0218928 A1 | 9/2008 | Baek | |
| 2008/0263318 A1* | 10/2008 | May | G06F 9/3851 712/23 |
| 2009/0031060 A1 | 1/2009 | Adachi | |
| 2009/0210590 A1* | 8/2009 | Circello | G06F 13/24 710/64 |
| 2011/0314190 A1* | 12/2011 | Tanaka | G06F 5/065 710/52 |
| 2012/0057479 A1 | 3/2012 | Maruyama et al. | |
| 2013/0117476 A1* | 5/2013 | Miller | G11C 7/1051 710/52 |

FOREIGN PATENT DOCUMENTS

| | | |
|---|---|---|
| CN | 101689157 A | 3/2010 |
| JP | 2000-059406 A | 2/2000 |
| JP | 2002-164872 A | 6/2002 |
| JP | 2007-213474 A | 8/2007 |
| JP | 2007-226492 A | 9/2007 |
| JP | 2009-157913 A | 7/2009 |
| JP | 2012-060207 A | 3/2012 |

* cited by examiner

MICROCOMPUTER

CROSS-REFERENCE TO RELATED APPLICATIONS

The disclosure of Japanese Patent Application No. 2012-257304 filed on Nov. 26, 2012 including the specification, drawings and abstract is incorporated herein by reference in its entirety.

BACKGROUND

The present invention relates to a microcomputer suited to control industrial apparatus. More particularly, the invention relates to a microcomputer advantageously used for synchronization control.

Some types of equipment require synchronization controls such as an alternative current (AC) servo, a general-purpose inverter, and a programmable logic controller (PLC). Such industrial apparatus needs to control industrial motors by issuing specified instructions at specified time. A microcomputer is provided for the industrial apparatus and allows an inverter to control an industrial motor using an instruction that equals a pulse-width modulated (PWM) control signal. The pulse width is expressed in a duty, i.e., a percentage representing a ratio between High and Low periods. Industrial apparatuses may be simultaneously operated for a series of processes. In such a case, the microcomputer provided for each industrial apparatus controls the corresponding industrial motor. The industrial apparatuses need to synchronize the time (time synchronization) in order to consistently issue a sequence of instructions in a specified chronological order.

The synchronization accuracy required for the time synchronization between industrial apparatus rapidly tends to be strict. In some cases, the accuracy is required to be as high as a microsecond or shorter. Communication based on serial communication or proprietary communication has been used for the time synchronization between industrial apparatus. Recently, there is an increasing demand for synchronous Ethernet communication (hereinafter simply referred to as synchronous Ethernet) that appends a synchronization function to Ethernet (registered trademark). The synchronous Ethernet includes Ethernet/IP or Profinet based on the IEEE1588 standard and EtherCAT based on ring or daisy chain networks. The time synchronization accuracy tends to be stricter. Some synchronous Ethernet technologies compliant with the IEEE1588 standard enable the accuracy as high as a microsecond or shorter.

The industrial controller disclosed in patent document 1 includes multiple units coupled with each other each of which has a clocking function with an accuracy on the order of nanoseconds. Of these units, one functions as a master and the others as slaves. The adjustment means is provided to gradually approximate time axes for the slaves to the time axis for the master.

The technology disclosed in patent document 2 can synchronize execution of processing programs among networked controllers without adjusting timings. A timetable is preprogrammed for each controller to perform cooperative operations. Each controller includes a clock module to keep track of absolute time and a clock synchronization means to control the synchronization. If an event occurs to initiate a program, the controller broadcasts the time of the event occurrence as a trigger to the other controllers. A controller, when receiving the trigger, adds a specified delay time to the trigger to generate a delay trigger. The controller initiates a sequence of programs from the delay trigger.

The technology disclosed in patent document 3 ensures the time synchronization accuracy between a networked controller and devices. The master includes a master global timer. Each device includes a slave global timer and an operation cycle timer. The master transmits a packet containing a time stamp that is provided with the global time indicated by the master global timer. Each slave receives the packet to perform correction, namely, synchronize the operation cycle timer with cycle control using a cycle control synchronization timing indicated by the time stamp and a time difference indicated by the slave global timer.

The motion control system disclosed in patent document 4 enables synchronous operations according to ever-changing network load situations and is free from synchronization errors. The master monitors a communication delay and forces a slave to start operation for synchronization at the time that equals the current time plus the delay time.

The communication control system disclosed in patent document 5 provides multiple controllers each of which includes a communication controller and an actuator and manipulates control targets. The controllers are coupled via a network and can operate in synchronization with each other. The second embodiment provides a communication control system for time synchronization using the time synchronization protocol compliant with IEEE1588. The entire communication control system synchronizes the time. Then, the communication controller acquires communication delays from the controllers and adjusts the communication delays when transmitting control instructions to the controllers.

The data transmitter disclosed in patent document 6 changes image data being received to image data from other image information devices. The image information device includes a clock processing portion that generates the current time synchronized with the time information received from the network. The image information device changes the received data when detecting a match with the specified time received from the system controller via the network. This enables to change image data in synchronization with an image frame (I frame) even if a change request is input between an I frame allowing the change and the next I frame.

PATENT DOCUMENTS

Patent Document 1: Japanese Unexamined Patent Publication No. 2009-157913
Patent Document 2: Japanese Unexamined Patent Publication No. 2007-213474
Patent Document 3: Japanese Unexamined Patent Publication No. 2002-164872
Patent Document 4: Japanese Unexamined Patent Publication No. 2007-226492
Patent Document 5: Japanese Unexamined Patent Publication No. 2012-60207
Patent Document 6: Japanese Unexamined Patent Publication No. 2000-59406

SUMMARY

The inventors examined patent documents 1 through 6 and found the following problems.

Industrial apparatuses are networked for synchronization control. One master is coupled to the same network. One of the industrial apparatuses may function as a master. The master issues an instruction that specifies an execution time according to the unified reference time. Devices such as a motor are controlled based on the instruction. If only the master is provided with the clock to clock the reference time, the industrial apparatus as a slave hardly provides synchronization control due to a communication delay. The technology disclosed in patent document 4 supplies the slave with the time to start processing in consideration of a communication delay. The communication delay varies with network loads and is therefore monitored periodically. The technology disclosed in patent document 1 provides the clock for each industrial apparatus as a slave. The technology corrects an error between the master clock and the slave clock and synchronizes these clocks with an accuracy on the order of nanoseconds. This is similar to the technology disclosed in patent document 3. Suppose a case where each industrial apparatus as the slave has the clock synchronized with the master and processes are scheduled at predetermined times. In such a case, as described in patent document 2, the processes may be synchronized using a timetable that previously stores times to start processes. According to patent document 2, however, the controller as a slave receives a trigger to start the process, generates a delay trigger by adding a specified delay time to the received trigger, and starts a sequence of processing programs from the delay trigger. This is similar to the technology disclosed in patent document 5. No time synchronization is available simply using the timetable that previously stores times to start processes.

Generally, the industrial apparatus uses a microcomputer to control devices such as a motor. The microcomputer includes a control signal input/output portion that controls a network interface and devices such as a motor. The microcomputer executes a control program to generate control signals. As described in patent document 1, the industrial apparatus as a slave includes the microcomputer and can be provided with a clock that synchronizes with the master with an accuracy on the order of nanoseconds. As described in patent document 2, the slave industrial apparatus may be provided with a timetable prestoring times to start processing and supply a trigger that allows the microcomputer to start processing. In this case, multiple slave devices synchronize at times on the order of nanoseconds. Triggers are expected to occur at times with the comparable high accuracy. The microcomputer starts processing based on the trigger but cannot control devices such as a motor with the comparable high accuracy. The microcomputer is supplied with the trigger as an interrupt. An interrupt process for the microcomputer includes overheads such as saving the running program in a register, determining an interrupt cause, and branching the process for the interrupt. These processes require several tens to hundreds of steps. The processes greatly vary with situations of a preceding active program or other factors. Even if the microcomputer operates ten nanoseconds per step, the overhead of an interrupt process requires several hundreds of nanoseconds to several microseconds. That is, the processes vary including the interrupt process overhead ranging from several hundreds of nanoseconds to several microseconds between the time to input the trigger and the time to reflect a processing result on the control signal for the device such as a motor.

The above-mentioned variation ranging from several hundreds of nanoseconds to several microseconds is negligibly small if the synchronization control for industrial apparatuses requires the accuracy of several milliseconds. However, such variation is significant if the accuracy is required to be as high as one microsecond or less. The image information device described in patent document 6 enables frame synchronization with an accuracy on the order of nanoseconds. The frame synchronization is needed just to switch between frame reception and display. The frame synchronization is completely based on hardware and is free from variation factors. However, complex processing makes it practically impossible to control the industrial apparatus using the hardware that is free from variation factors in the number of execution steps. The industrial apparatus control inevitably uses software. It is impossible to avoid the variation ranging from several hundreds of nanoseconds to several microseconds including the interrupt process overhead. Therefore, it is difficult to ensure the time synchronization and the delay time.

The following describes means to solve the problems. These and other objects and novel features of the invention may be readily ascertained by referring to the following description and appended drawings in the specification.

An embodiment of the invention provides the following means.

A microcomputer to control devices such as motors in an industrial apparatus includes a CPU, a peripheral module to control an external apparatus based on a specified parameter, and a communication interface capable of communication with other devices via a network. The communication interface includes a time register and an event register. The time register holds times to synchronize with other devices based on the communication via the network. The communication interface compares a value held in the time register with a value held in the event register. If a match is found, the communication interface issues a CPU interrupt to the CPU and issues a peripheral module interrupt to the peripheral module. The peripheral module includes a compare register and a buffer register. The compare register holds current values for a parameter to control external apparatuses. The buffer register holds update values for the parameter. The peripheral module generates a control signal to control external apparatuses based on current values held in the compare register. In response to the peripheral module interrupt, the peripheral module transfers an update value stored in the buffer register to the compare register to update the current value. In response to the CPU interrupt, the CPU starts a parameter update program to calculate the next update value for the parameter and writes the calculated update value to the buffer register.

The following summarizes an effect provided by the embodiment.

The highly accurate synchronization and the delay time can be ensured for the parameter correction time without being affected by overheads due to CPU interrupts and variations in the time to execute the parameter update program.

DETAILED DESCRIPTION

1. Embodiment Overview

Figure 1:
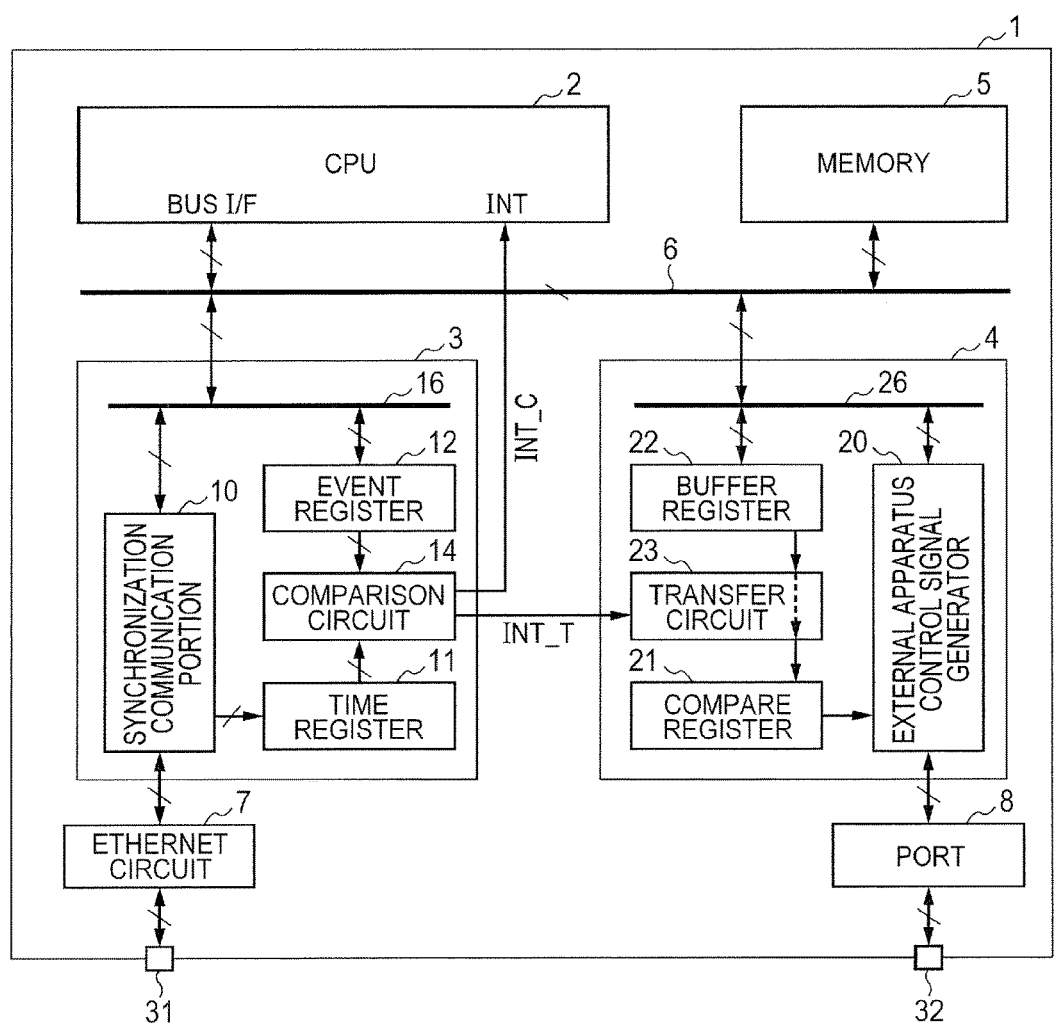
FIG. 1 is a block diagram illustrating a configuration of a microcomputer according to a first embodiment.

The following summarizes representative embodiments disclosed in this application. In the following description, parenthesized reference numerals correspond to those shown in the appended drawings and just denote examples belonging to the concept of the corresponding components.

Figure 2:
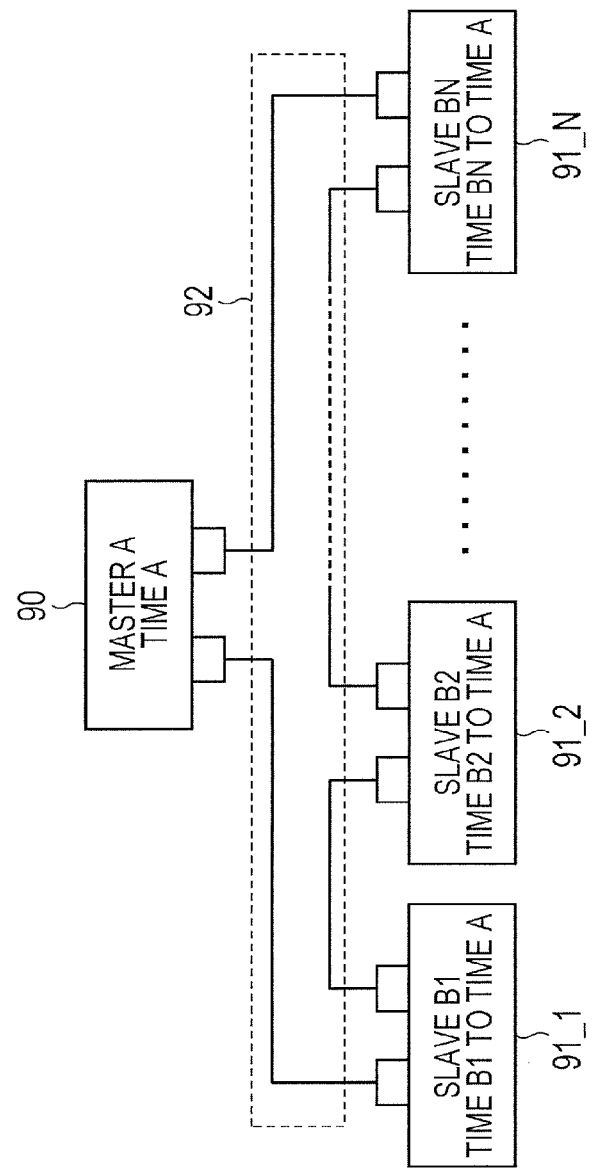
FIG. 2 exemplifies a network configuration of devices for time synchronization.
Figure 3:
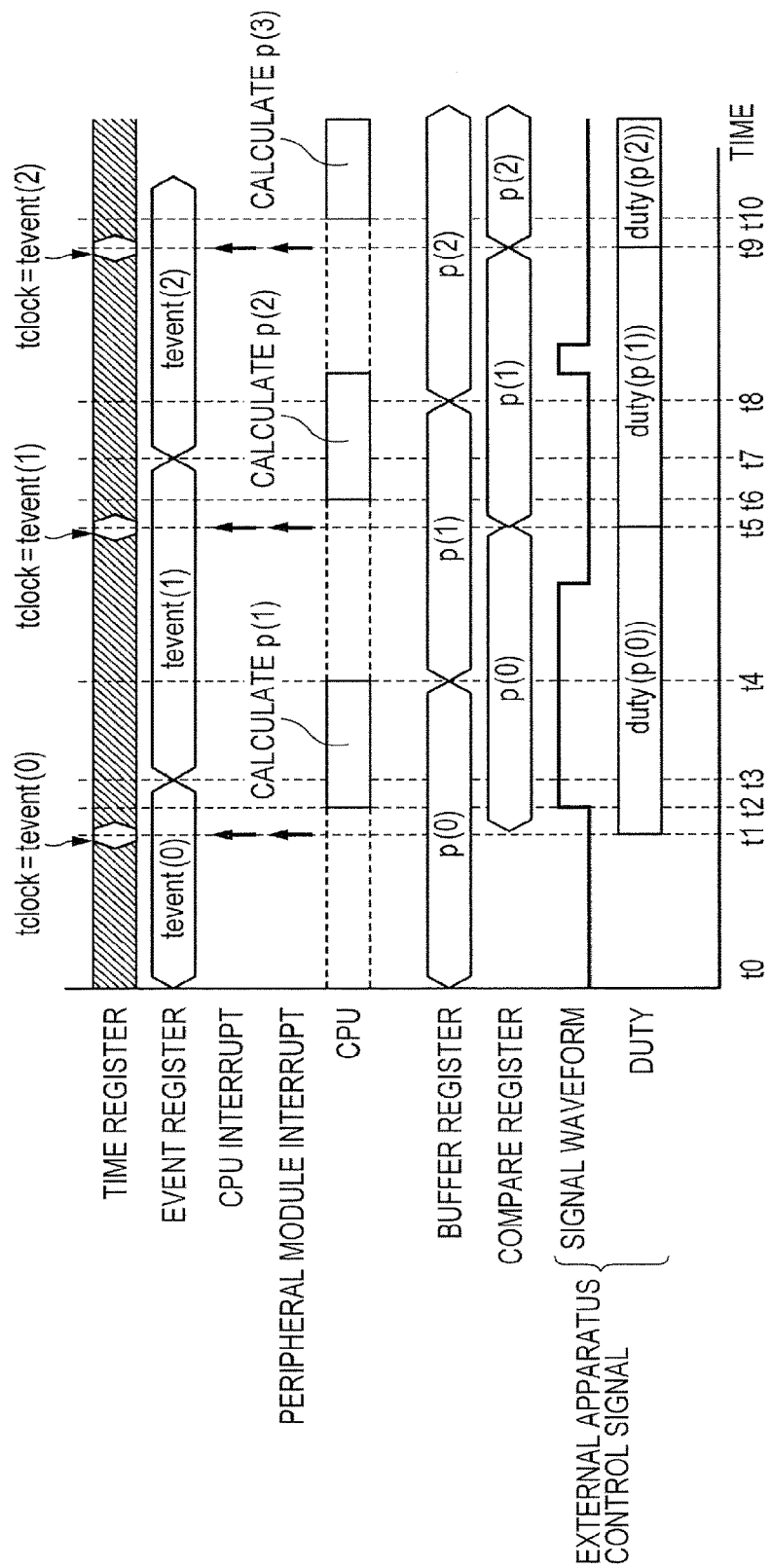
FIG. 3 is a timing chart illustrating operations of the microcomputer according to the first embodiment.

<1> Comparing the Event Register with the Time Register (see FIGS. 1 through 3)

A microcomputer (1) includes a CPU (2), a peripheral module (4) to control an external apparatus based on a specified parameter, and a communication interface (3, 7) capable of communication with other devices (91) via a network (92).

The communication interface includes a first register (11), a second register (12), and a comparison circuit (14). The first register holds times to synchronize with the other devices based on communication via the network. The comparison circuit compares a value held in the first register with a value held in the second register. If a match is found, the comparison circuit issues a CPU interrupt (INT_C) to the CPU, and issues a peripheral module interrupt (INT_T) to the peripheral module.

The peripheral module includes a third register (21) and a fourth register (22). The third register holds a current value of the parameter. The fourth register holds an update value of the parameter. The peripheral module generates a control signal (32) to control the external apparatus based on the current value.

The CPU is capable of executing a parameter update program in response to the CPU interrupt to start calculating the update value of the parameter and write the update value to the fourth register.

The peripheral module transfers a value stored in the fourth register to the third register in response to the peripheral module interrupt.

Consequently, the highly accurate synchronization and the delay time can be ensured for the parameter correction time without being affected by overheads due to CPU interrupts and variations in the time to execute the parameter update program.

<2> PWM Control

According to item 1, the peripheral module generates a pulse-width modulated control signal to drive an externally coupled device (93). The parameter provides a value to specify a duty for the pulse width modulation. The communication interface writes a correction time (tevent) to the second register. The correction time is supplied to the communication interface via the network and specifies the time to update the parameter from the current value to the update value. The parameter update program calculates the update value to be supplied to the parameter at the correction time.

Consequently, the externally coupled device can be operated based on the highly accurate time synchronization.

<3> Event Buffer According to the First Embodiment (see FIGS. 4 through 10)

The communication interface includes a first buffer (13) that is capable of holding at least one piece of data and outputs held data in the same order as the data was input. The communication interface writes the correction time to the first buffer, compares a value held in the first register with a value held in the second register and, if a match is found, writes an output from the first buffer to the second register.

This enables to alleviate limitations on timings to write correction times from the CPU (2) to the communication interface (3).

<4> Interrupt Selection Circuit

According to item 2, the peripheral module interrupt is coupled to the peripheral module via an interrupt selection circuit (9).

This enables to select peripheral modules as targets of a peripheral module interrupt and improve general-purpose properties of the microcomputer.

<5> PWM Generator Circuit

According to item 2, the peripheral module interrupt is directly coupled to the peripheral module.

The peripheral module includes a PWM generator circuit (20_3) and the fourth register (22_3) and includes a second buffer (17) capable of holding at least one piece of data and outputting held data in the same order as the data was input. The PWM generator circuit generates the pulse-width modulated control signal based on the current value held in the third register (21_3) and transfers a value output from the second buffer to the third register when the peripheral module interrupt is input.

This enables to alleviate limitations on timings to write a parameter from the CPU (2) to the peripheral module (4_3).

<6> Phase Adjustment Circuit

According to item 5, the PWM generator circuit generates a 3-phase control signal. The peripheral module further includes a variable delay circuit (30_U, 30_V, 30_W), a phase adjustment circuit (29), and a phase register (18). The variable delay circuit is inserted correspondingly to the 3-phase control signal. The phase adjustment circuit supplies a delay amount to the variable delay circuit. The phase register supplies a phase adjustment parameter to the phase adjustment circuit.

This enables synchronization control over external apparatuses such as motors that require phase adjustment.

<7> Synchronization at Startup

According to item 1, the peripheral module generates a pulse-width modulated control signal to control an externally coupled device (93). The parameter provides a value to represent a duty for the pulse width modulation.

The communication interface writes a start time (tstart) and a correction time (tevent) to the second register. The start time is supplied to the communication interface via the network. The correction time specifies the time to update the parameter from the current value to the update value.

The parameter update program includes a step that writes an initial value of the parameter to the third register at the start time, permits the peripheral module interrupt in response to the CPU interrupt at the start time, and inhibits the subsequent CPU interrupt.

This enables to ensure highly accurate synchronization and delay time at the start time.

<8> Controlling Multiple Devices

According to item 7, the peripheral module generates multiple sets of pulse-width modulated control signals to control multiple externally coupled devices (93_1 and 93_2). The parameter provides multiple sets of values representing duties for the pulse width modulation corresponding to each of the sets of the control signals.

The communication interface includes the multiple second registers corresponding to the sets of control signals and writes the start time and the correction time to each of the second registers. The start time and the correction time are supplied to the communication interface via the network and correspond to each of the sets of control signals.

The comparison circuit compares a value held in the first register with values held in the second registers (12_1 and 12_2). If a match is found, the comparison circuit issues multiple peripheral module interrupts (INT_T1 and INT_T2) corresponding to the sets of control signals to the peripheral module.

The peripheral module includes the third registers and the fourth registers corresponding to the sets of control signals and generates the sets of control signals based on the current value corresponding to each of the sets of control signals.

The peripheral module transfers a value stored in the corresponding fourth register to the corresponding third register in response to the peripheral module interrupts.

This enables to independently supply correction times for parameters to control external apparatuses and provide more highly accurate and versatile synchronization control.

2. Detailed Description of the Embodiment

The embodiment will be described in more detail.

First Embodiment

FIG. 1 is a block diagram illustrating a configuration of a microcomputer according to a first embodiment. A microcomputer 1 includes a CPU 2, a communication interface 3, a peripheral module 4, and memory 5. The communication interface 3 can communicate with other devices 91 via a network. The peripheral module 4 controls external apparatuses based on a specified parameter. These components are coupled to each other via a bus 6. The microcomputer 1 may be configured as a large scale integrated (LSI) circuit formed on a single substrate according to known design and manufacturing technologies.

The communication interface 3 includes a synchronization communication portion 10, a time register 11, an event register 12, and a comparison circuit 14. A terminal 31 is coupled to a network 92 and is provided with a physical interface 7 coupled to the synchronization communication portion 10. The physical interface 7 provides a circuit that satisfies physical layer specifications for the network 92. If the network 92 is Ethernet, the Ethernet circuit 7 is provided. The time register 11 clocks the local time synchronized with other devices based on communication via the network 92. The time register 11 includes a counter driven by a clock signal with specified accuracy. The time register 11 is calibrated with reference to the master time the synchronization communication portion 10 receives via the network 92. FIG. 2 exemplifies a network configuration of devices for time synchronization. A master 90 is coupled to slaves 91_1 through 91_N via the network 92. As illustrated in FIG. 2, the network 92 uses a daisy chain topology, for example. The network 92 may use a star topology via a hub. Further, the network 92 may be wired or wireless and may be available in any forms. Each of the master 90 and the slaves 91_1 through 91_N includes a clock means to hold the time. Each of the slaves 91_1 through 91_N allows the corresponding clock means to synchronize its time with time A of the master 90. The time of the clock means need not always equal time A. A specified offset may be provided between them. Time differences between the apparatuses include offset times specific to the apparatuses and propagation delays over the network. According to the IEEE1588 standard, for example, the Ethernet frame communication can adjust times (B1 through BN) of N slave apparatuses (91_1 through 91_N) to time A of the master 90.

The event register holds times (correction times) to update a parameter that controls an external apparatus. The correction times are successively input to the microcomputer 1 via the network 92. The CPU 2 receives the correction times via the synchronization communication portion 10 of the communication interface 3. The CPU 2 successively writes the received correction times to the event register 12. The CPU 2 may receive a new correction time if the written correction time has not elapsed yet. In such a case, the CPU 2 maintains the new correction time by storing it in the memory 5, for example.

The comparison circuit 14 compares a value (local time) held in the time register 11 with a value (correction time) held in the event register 12. If a match is found, the comparison circuit 14 issues CPU interrupt INT_C to the CPU 2 and issues peripheral module interrupt INT_T to the peripheral module 4. CPU interrupt INT_C and peripheral module interrupt INT_T may occur simultaneously or at different times.

The peripheral module 4 includes an external apparatus control signal generator 20, a compare register 21, and a buffer register 22. The compare register 21 holds a current value for the parameter that controls an external apparatus. The buffer register 22 holds updated parameter values. The external apparatus control signal generator 20 generates a control signal to control external apparatuses based on current values held in the compare register 21. The control signal 32 is output via a port 8. If the external apparatus represents an AC motor, for example, the control signal 32 equals a PWM signal. The parameter provides a value that determines the duty. The port 8 provides a circuit that incorporates a signal to drive an LSI terminal or a signal supplied from the terminal into the inside. Known circuit and device technologies are used to configure the port 8. The port 8 may include a drive circuit, an input circuit, a level conversion circuit, a pull-up circuit, a protection circuit or a protection element against electrostatic destruction, an input/output changeover circuit, and a terminal function changeover circuit.

For example, the CPU 2 provides a processor that can execute programs stored in the memory 5. The CPU 2 can execute a parameter update program. When supplied with CPU interrupt INT_C, the parameter update program starts calculating an update value for the parameter and writes the calculated update value to the buffer register 22. The peripheral module 4 includes a transfer circuit 23. When supplied with peripheral module interrupt INT_T, the transfer circuit 23 transfers a value to be stored in the buffer register 22 to the compare register 21.

The memory 5 is available as random access memory (RAM), read only memory (ROM), or a combination of both. The memory 5 can store programs executed by the CPU 2 or data. The bus 6 is available as an example means to couple the CPU 2 and the memory 5 with other components and may be configured otherwise. For example, the bus 6 may be additionally provided with an external bus interface to use other external memory or may contain cache memory or a memory management unit.

FIG. 3 is a timing chart illustrating operations of the microcomputer according to the first embodiment. Values of the time register 11 are shaded in FIG. 3 and represent local time tclock that is clocked in real time. The apparatuses are controlled to synchronize with the master and are coupled to the network 92 to hold respective local times. To be compliant with the IEEE1588 standard, for example, the local time synchronizes with the time managed by the master with a high accuracy on the order of nanoseconds. The parameter to control an external apparatus is updated at correction times tevent(0), tevent(1), tevent(2), and so on that are successively input to the microcomputer 1 via the network 92. The CPU 2 writes the first correction time tevent(0) to the event register 12. At the same time, the CPU 2 writes, to the buffer register 22, update value p(0) for a parameter to be updated at the correction time. At time t1, suppose that local time tclock held in the time register 11 matches correction time tevent(0) held in the event register 12. Then, CPU interrupt INT_C is issued to the CPU 2. Peripheral module interrupt INT_T is issued to the peripheral module 4. When peripheral module interrupt INT_T is input to the peripheral module 4, the transfer circuit 23 transfers the first update value p(0) stored in the buffer register 22 to the compare register 21. The external apparatus control signal generator 20 generates a control signal 32 for duty (p(0)) specified by update value p(0). A delay occurs after peripheral module interrupt INT_T is issued until the above-mentioned sequence of operations generates the control signal 32 for duty(p(0)) specified by update value p(0). The delay can be limited to several cycles. The number of delay cycles can be constant. This is because no software is needed and the design depends entirely on the hardware. According to the above-mentioned example, the external apparatus control signal generator 20 generates and outputs a signal whose duty is variable. However, the signal is not limited thereto. Any signal is available if it is under control of a parameter supplied from the compare register 21. For example, available signals include a high-frequency signal whose amplitude varies with a parameter, and an alternating current signal whose frequency varies with a parameter. The example uses one parameter but is not limited thereto. Multiple parameters may be used.

When CPU interrupt INT_C is input at time t1, the CPU 2 starts calculating the next update value p(1) at t2. Some delay (overhead) occurs after CPU interrupt INT_C is input until the interrupt process starts calculating an update value for the parameter. When CPU interrupt INT_C is input, the CPU 2 determines an interrupt cause. The CPU 2 references a vector table to find the interrupt cause. The CPU 2 acquires a branch address corresponding to the interrupt cause for the interrupt process. To interrupt an active process as well, the CPU 2 saves the contents of a general-purpose register and then branches to the destination address specified in the vector table to start the interrupt process. In this manner, some delay occurs after the interrupt signal is input until the interrupt process starts. An overhead due to the CPU interrupt also varies with the amount of data to be saved or the bus traffic.

In the interrupt process, the CPU 2 executes the parameter update program to calculate the next update value p(1) for the parameter. In addition, the CPU 2 writes the next correction time tevent(1) to the event register 12 at time t3, for example. According to the first CPU interrupt, the CPU 2 can detect that the first correction time tevent(0) has already elapsed. The CPU 2 just needs to write the next correction time tevent(1) to the event register 12 during an interrupt processing routine activated by the interrupt. This can prevent the next correction time from being overwritten before the already written correction time is reached. The CPU 2 has calculated the next update value p(1) at time t4, and then writes the value to the buffer register 22. This process is also included in the interrupt processing routine, making it possible to prevent the value held in the buffer register 22 from being overwritten before the preceding update value p(0) is transferred to the compare register 21.

At time t5, local time tclock matches correction time tevent(1). Then, peripheral module interrupt INT_T is issued. Update value p(1) is transferred from the buffer register 22 to the compare register 21. At time t5, the duty for the control signal 32 changes to value duty (p(1)) specified by update value p(1). At time t5, CPU interrupt INT_C also occurs to start an interrupt process. At time t6, the CPU 2 starts calculating the next update value p(2). At t8, the CPU completes the calculation and writes the value to the buffer register 22. In the same interrupt processing routine, the next correction time tevent(2) is written to the event register 12 at time t7.

As described above, an overhead due to the CPU interrupt varies time t2 to start calculating update value p(1) or may also vary time t4 to complete the calculation of update value p(1). However, update value p(1) is reflected in the duty as an output of the control signal 32 at time t5. At time t5, local time tclock matches specified correction time tevent(1). Suppose that the same correction time tevent(1) is assigned to slave devices 91_1 through 91_N. Then, times t2 and t4 vary with overheads due to CPU interrupts on slave devices 91_1 through 91_N and variations in the time to execute the parameter update program. On the other hand, the parameter is updated to update value p(1) at time t5. At time t5, the devices are synchronized with the accuracy as high as the synchronization accuracy of local time tclock. Local time tclock is highly accurately synchronized among the devices. At time t5, local time tclock matches specified correction time tevent(1). Therefore, the devices assigned the same correction time tevent(1) synchronize with each other with the accuracy as high as the synchronization accuracy of local time tclock.

Consequently, the highly accurate synchronization and the delay time can be ensured for the parameter correction time without being affected by overheads due to CPU interrupts and variations in the time to execute the parameter update program.

The above-mentioned embodiment and later ones contain expressions such as the same time or a match in times. Such expressions are not intended to be understood strictly and imply several cycles of errors in hardware configurations such as pipelining.

Second Embodiment

Figure 4:
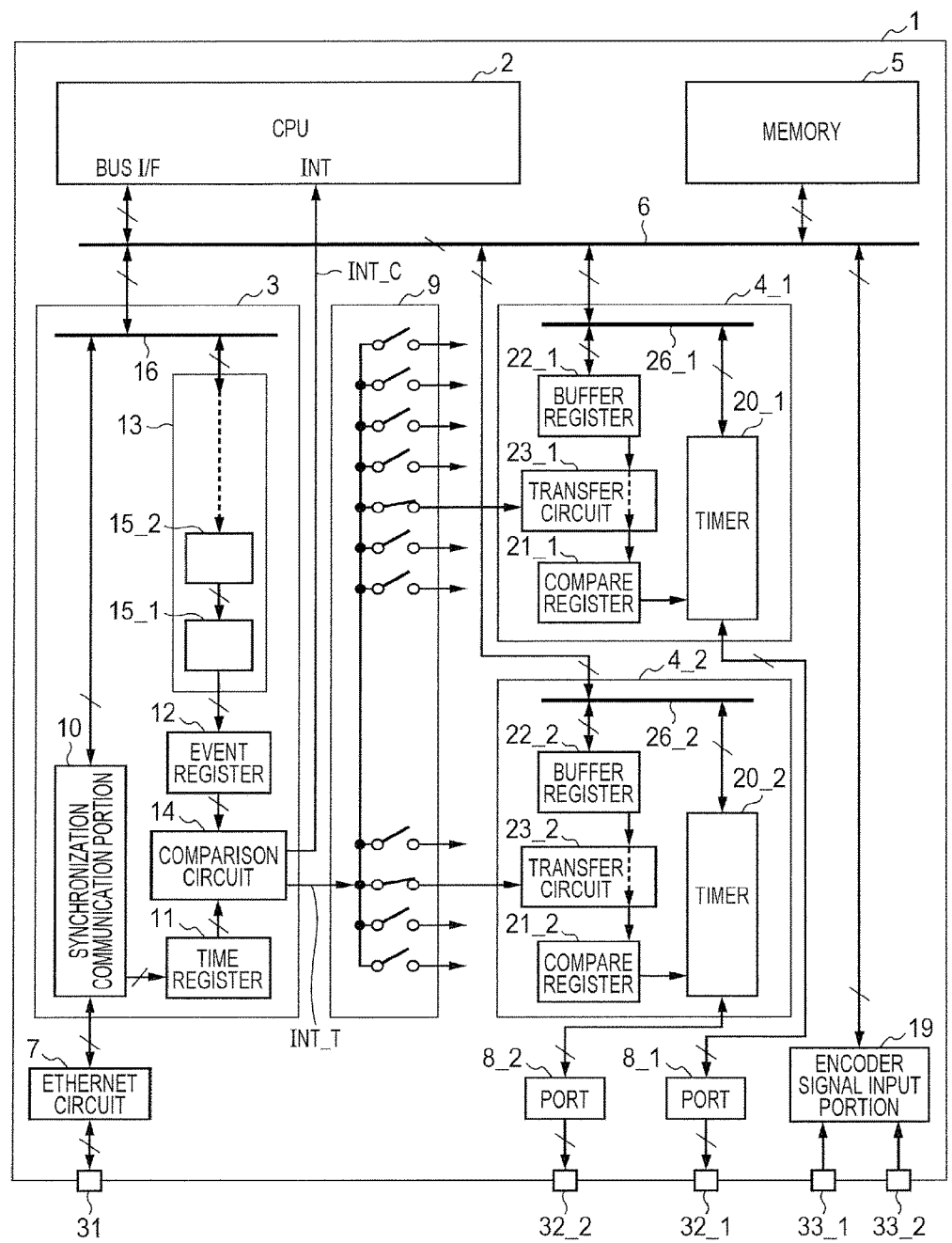
FIG. 4 is a block diagram illustrating a configuration of a microcomputer according to a second embodiment.

FIG. 4 is a block diagram illustrating a configuration of a microcomputer according to a second embodiment. The communication interface 3 included in the microcomputer 1 further includes an event buffer 13 compared to the communication interface 3 according to the first embodiment. The event buffer 13 includes registers 15_1 and 15_2. The event buffer 13 transfers correction times written from the bus 6 to the event register 12 in the order in which the correction times were written. The event buffer 13 may be configured as first-in first-out (FIFO) shift registers, for example. If a value in the time register 11 matches a value in the event register 12, the event buffer 13 transfers the earliest value stored therein to the event register 12. If configured as an FIFO system, the event buffer 13 successively shifts the subsequent values. As the event buffer 13 is provided, the CPU 2 can successively write the received correction times tevent(0), tevent(1), tevent(2), and so on to the event buffer 13. Suppose that the event buffer 13 is not provided and the next correction time tevent(1) is written to the event register 12 before local time tclcok reaches correction time tevent(0). In such a case, the parameter is not updated at the correction time tevent(0). The parameter is not updated at the correction time tevent(1) if the next correction time tevent(1) is written to the event register 12 at the time later than tevent(1). As a result, timings to write correction time tevent(1) to the event register 12 are limited. For example, the interrupt processing routine is performed for CPU interrupt INT_C that occurs when local time tclcok matches correction time tevent(0). In the interrupt processing routine, the next correction time tevent(1) just needs to be allocated to the event register 12. In this case, the memory 5 stores the received correction times tevent(0), tevent(1), tevent(2), and so on. As described in the embodiment, the event buffer 13 can alleviate limitations on timings to write correction times from the CPU 2 to the communication interface 3 and reduce loads on the interrupt processing routine for CPU interrupt INT_C.

The microcomputer 1 includes two peripheral modules 4_1 and 4_2 each of which includes a timer as the external apparatus control signal generator 20 to generate a PWM-controlled control signal. The peripheral modules 4_1 and 4_2 output the PWM control signal to terminals 32_1 and 32_2 via ports 8_1 and 8_2, respectively. The timer configuration and operations to generate the PWM control signal will be described later. The microcomputer 1 further includes an interrupt selection circuit 9. The interrupt selection circuit 9 includes a selection circuit capable of selectively coupling the supplied peripheral module interrupt INT_T with the peripheral modules 4_1 and 4_2 and various peripheral modules (not shown). The embodiment selects coupling to the peripheral modules 4_1 and 4_2. The interrupt selection circuit 9 can select peripheral modules as targets of a peripheral module interrupt and improve general-purpose properties of the microcomputer.

The microcomputer 1 further includes an encoder signal input portion 19. The encoder signal input portion 19 is supplied with an encoder signal via a port 8_3 (not shown). The encoder signal monitors operations of external apparatuses. The encoder signal input portion 19 is accessed from the CPU 2 via the bus 6.

Figure 5:
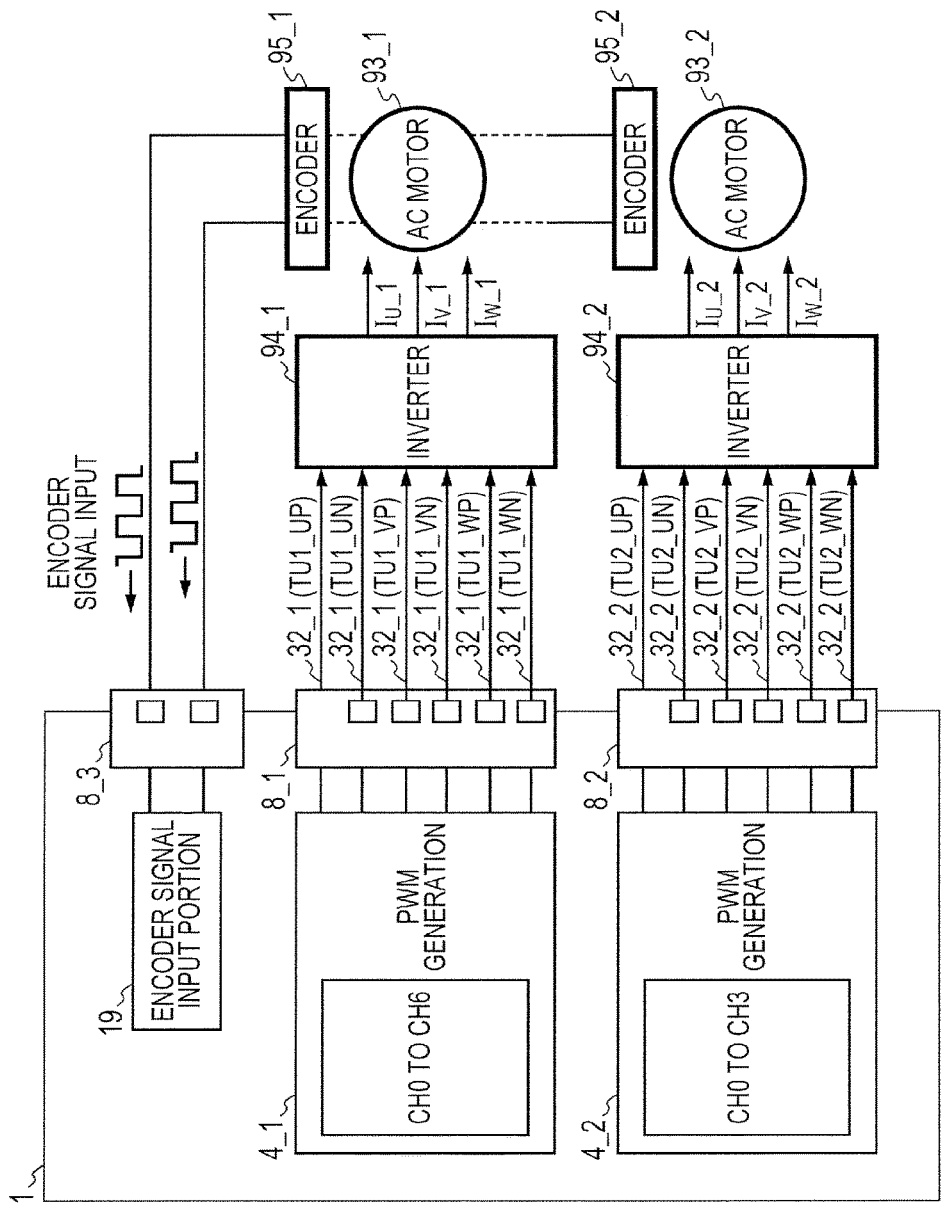
FIG. 5 is a block diagram illustrating coupling between the microcomputer and external devices.

FIG. 5 is a block diagram illustrating coupling between the microcomputer and external devices. The microcomputer 1 is coupled with two AC motors 93_1 and 93_2 via inverters 94_1 and 94_2, respectively. Three-phase signals Iu_1, Iv_1, and Iw_1 drive the AC motor 93_1. The inverter 94_generates the three-phase signals Iu_1, Iv_1, and Iw_1 from three-phase complementary PWM control signals TU1_UP, TU1_UN, TU1_VP, TU1_VN, TU1_WP, and TU1_WN. Similarly, three-phase signals Iu_2, Iv_2, and Iw_2 drive the AC motor 93_2. The inverter 94_2 generates the three-phase signals Iu_2, Iv_2, and Iw_2 from three-phase complementary PWM control signals TU2_UP, TU2_UN, TU2_VP, TU2_VN, TU2_WP, and TU2_WN. The AC motors 93_1 and 93_2 are provided with encoders 95_1 and 95_2, respectively, that function as position detectors. An encoder signal detects positions of the AC motors 93_1 and 93_2 and is input to the encoder signal input portion 19 of the microcomputer via the port 8_3.

Figure 6:
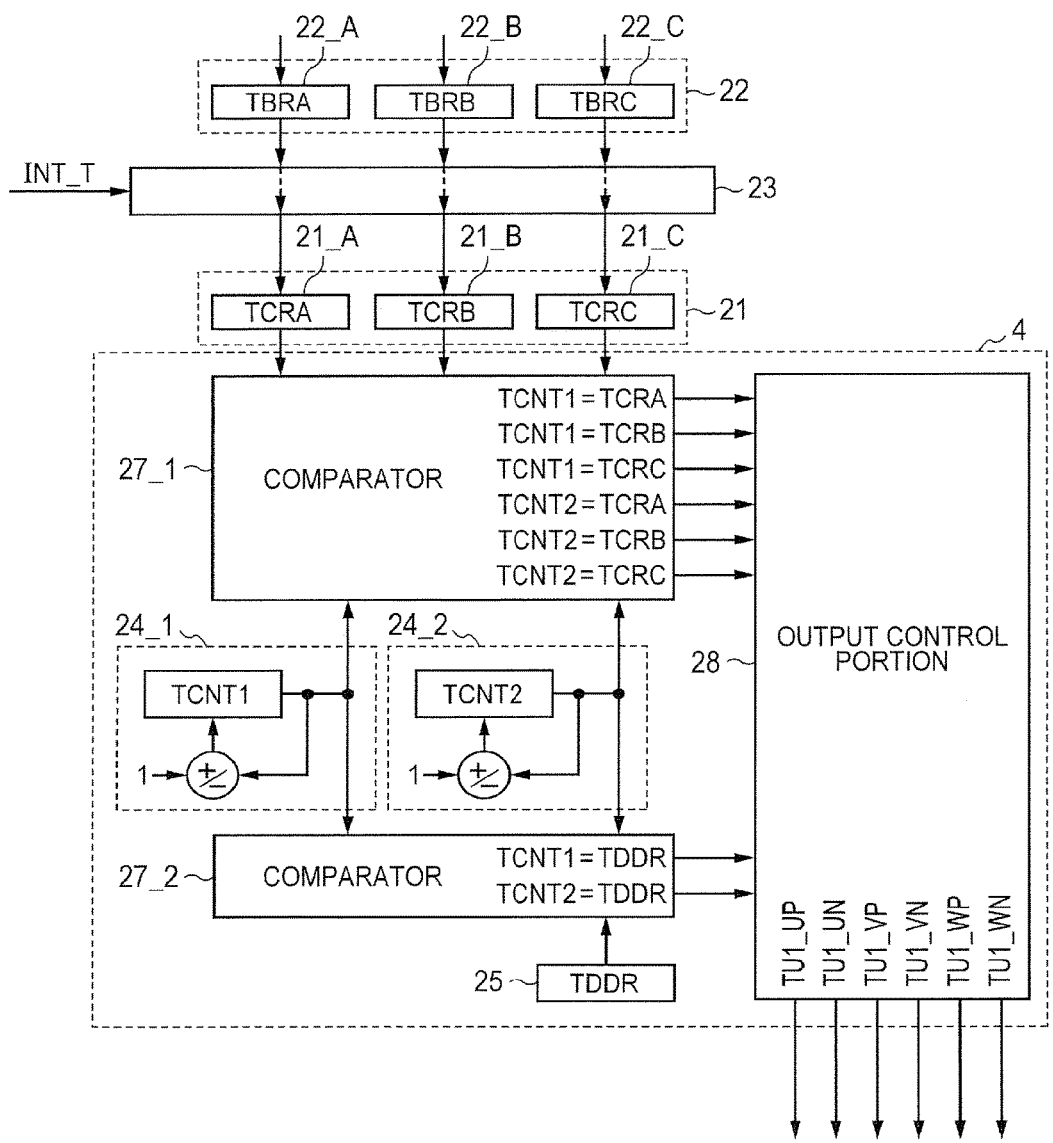
FIG. 6 is a block diagram illustrating a configuration of a timer according to the second embodiment.

FIG. 6 is a block diagram illustrating a configuration of a timer according to the second embodiment. The diagram also contains the compare register 21, the buffer register 22, and the transfer circuit 23. To correspond to the 3-phase complementary PWM control signals, the compare register 21 includes registers TCRA(21_A), TCRB(21_B), and TCRC(21_C). The buffer register 22 includes registers TBRA(22_A), TBRB(22_B), and TBRC(22_C). When supplied with INT_T as an example of the peripheral module interrupt, the transfer circuit 23 transfers a value of buffer register TBRA(22_A) to compare register TCRA(21_A), a value of buffer register TBRB(22_B) to compare register TCRB(21_B), and a value of buffer register TBRC(22_C) to compare register TCRC(21_C).

As an example of the peripheral module 4, the timer modules 4_1 and 4_2 include counters 24_1 and 24_2, comparators 27_1 and 27_2, respectively, and an output control portion 28. The timer modules 4_1 and 4_2 may or may not be configured equally. Generally, the timer as a peripheral module of the microcomputer is versatile. The illustrated configuration example also provides a setting example for general-purpose timers. The counters 24_1 and 24_2 include registers TCNT1 and TCNT2 and are capable of increment and decrement. The CPU 2 can read or write to the counters 24_1 and 24_2 via the bus 6 though a detailed circuit configuration is not illustrated. The counters 24_1 and 24_2 can switch between increment and decrement according to a timer interrupt as the peripheral module interrupt.

The comparison circuit 27_1 compares values of registers TCNT1 and TCNT2 for counters 24_1 and 24_2 with values of compare registers TCRA(21_A), TCRB(21_B), and TCRC(21_C). The comparison circuit 27_1 outputs six combinations of match signals to the output control portion 28. The comparison circuit 27_2 compares values of registers TCNT1 and TCNT2 for counters 24_1 and 24_2 with a value of dead time register TDDR(25). The comparison circuit 27_2 outputs two combinations of match signals to the output control portion 28.

The output control portion 28 generates and outputs three-phase complementary PWM control signals TU1_UP, TU1_UN, TU1_VP, TU1_VN, TU1_WP, and TU1_WN based on the supplied match signals.

Figure 7:
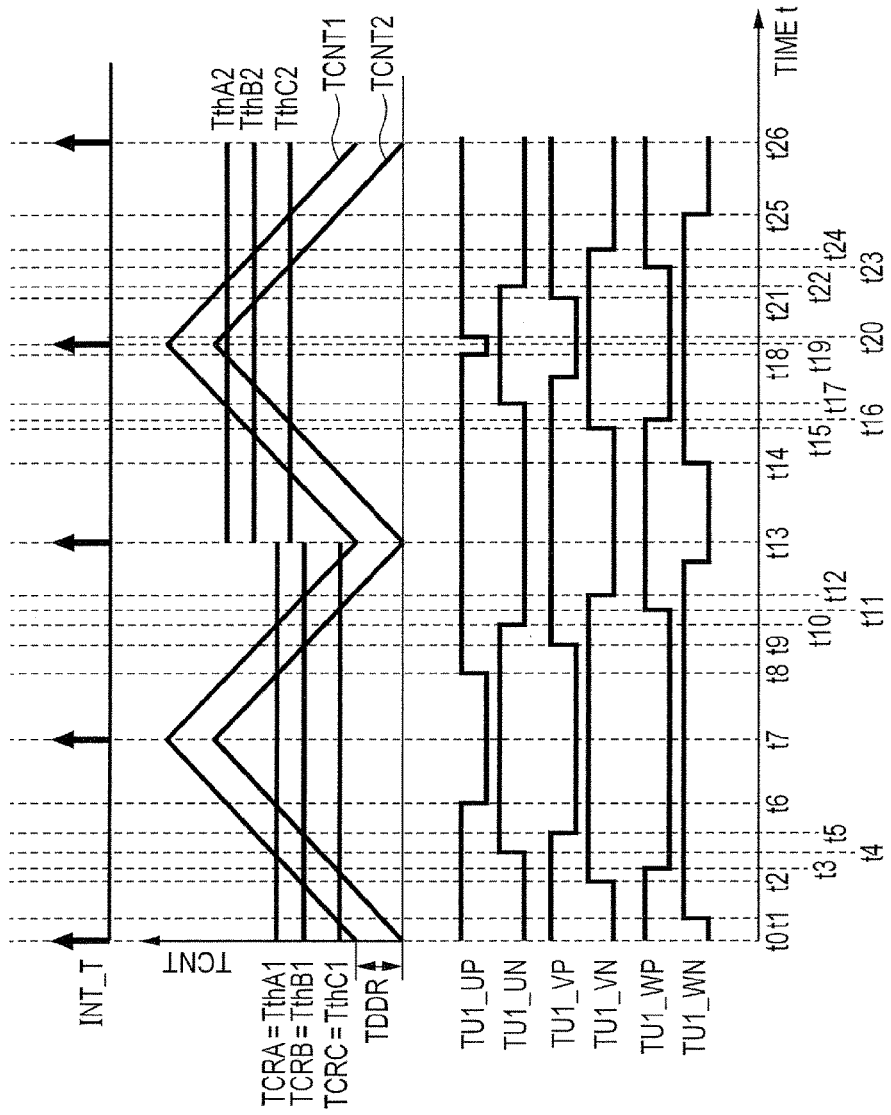
FIG. 7 is a timing chart illustrating operations of the timer according to the second embodiment.

FIG. 7 is a timing chart illustrating operations of the timer according to the second embodiment. The horizontal axis represents the time. The vertical axis represents, from the top to the bottom, timer interrupt INT_T, TCNT as analog representation of values of registers TCNT1 and TCNT2 for counters 24_1 and 24_2, and waveforms of the three-phase complementary PWM control signals TU1_UP, TU1_UN, TU1_VP, TU1_VN, TU1_WP, and TU1_WN. The comparison circuit 27_1 generates duties according to a comparison match between the timer counters and the compare registers, that is, timer counters TCNT1 and TCNT2 and compare registers TCRA(21_A), TCRB(21_B), and TCRC(21_C).

The counters 24_1 and 24_2 operate as up-counters during a period from t0 to t7, that is, from the first timer interrupt to the next timer interrupt using an offset value placed in dead time register TDDR (25). The timer interrupt at time 7 changes the increment to the decrement. The counters 24_1 and 24_2 then operate as down-counters. The increment and the decrement alternate subsequently each time the timer interrupt occurs.

The first timer interrupt at time t0 supplies compare registers TCRA(21_A), TCRB(21_B), and TCRC (21_C) with initial values TthA1, TthB1, and TthC1, respectively. The TCNT axis in FIG. 7 provides analog representation of the supplied values. At time t1, TCNT1 matches compare register TCRC(21_C). The comparison circuit 27_1 outputs the result to the output control portion 28. The output control portion 28 reverses TU1_WN, one of the three-phase complementary PWM control signals, from the low level to the high level. Subsequently, a match between TCNT1 and TthB1 at time t2 reverses TU1_VN. A match between TCNT2 and TthC1 at time t3 reverses TU1_WP. A match between TCNT1 and TthA1 at time t4 reverses TU1_UN. A match between TCNT2 and TthB1 at time t5 reverses TU1_VP. A match between TCNT2 and TthA1 at time t6 reverses TU1_UP. As described above, the timer interrupt at time t7 changes the increment to the decrement. A match between TCNT2 and TthA1 at time t8 reverses TU1_UP. A match between TCNT2 and TthB1 at time t9 reverses TU1_VP. A match between TCNT1 and TthA1 at time t10 reverses TU1_UN. A match between TCNT2 and TthC1 at time t11 reverses TU1_WP. A match between TCNT1 and TthB1 at time t12 reverses TU1_VN.

The timer interrupt at time t3 updates values of the compare registers TCRA(21_A), TCRB(21_B), and TCRC (21_C) to update values TthA2, TthB2, and TthC2, respectively. To do this, timer interrupt INT_T allows the transfer circuit 23 to transfer the value of buffer register TBRA (22_A) to compare register TCRA(21_A), the value of TBRB(22_B) to TCRB(21_B), and the value of TBRC (22_C) to TCRC(21_C). The CPU 2 previously writes update values TthA2, TthB2, and TthC2 to the buffer registers TBRA(22_A), TBRB(22_B), and TBRC(22_C). After that, the period between times t14 and 26 repeats the same operation as that for the period between times t1 and t3. Updating the values of compare register TCRA(21_A), TCRB(21_B), TCRC(21_C) changes the duties for the output three-phase complementary PWM control signals TU1_UP, TU1_UN, TU1_VP, TU1_VN, TU1_WP, and TU1_WN.

The times for the CPU 2 to calculate and write update values TthA2, TthB2, and TthC2 vary with an overhead due to the CPU interrupt and the time to execute the parameter update program. When the values of the compare register TCRA(21_A), TCRB(21_B), TCRC(21_C) are updated to the update values TthA2, TthB2, and TthC2, respectively, the update time synchronizes with the timer interrupt at time t13. The timer interrupt at time t13 occurs at local time tclock that is synchronized among salve devices. The time to generate the timer interrupt is also highly accurately synchronized among slave devices. Therefore, it is also possible to highly accurately synchronize the time to update values of the compare register TCRA(21_A), TCRB(21_B), and TCRC(21_C) among slave devices.

While there has been described the method of controlling the AC motor 93_1 using the timer module 4_1, the same method controls the AC motor 93_2 using the timer module 4_2 and a description is omitted for simplicity. The two AC motors 93_1 and 93_2 are controlled in highly accurate synchronization with AC motors and other external apparatuses controlled by the other slave devices.

The highly accurate synchronization and delay time can be ensured for the parameter correction time without being affected by overheads due to CPU interrupts and variations in the time to execute the parameter update program. Consequently, externally coupled devices (motors) can be operated based on the highly accurate time synchronization.

Figure 8:
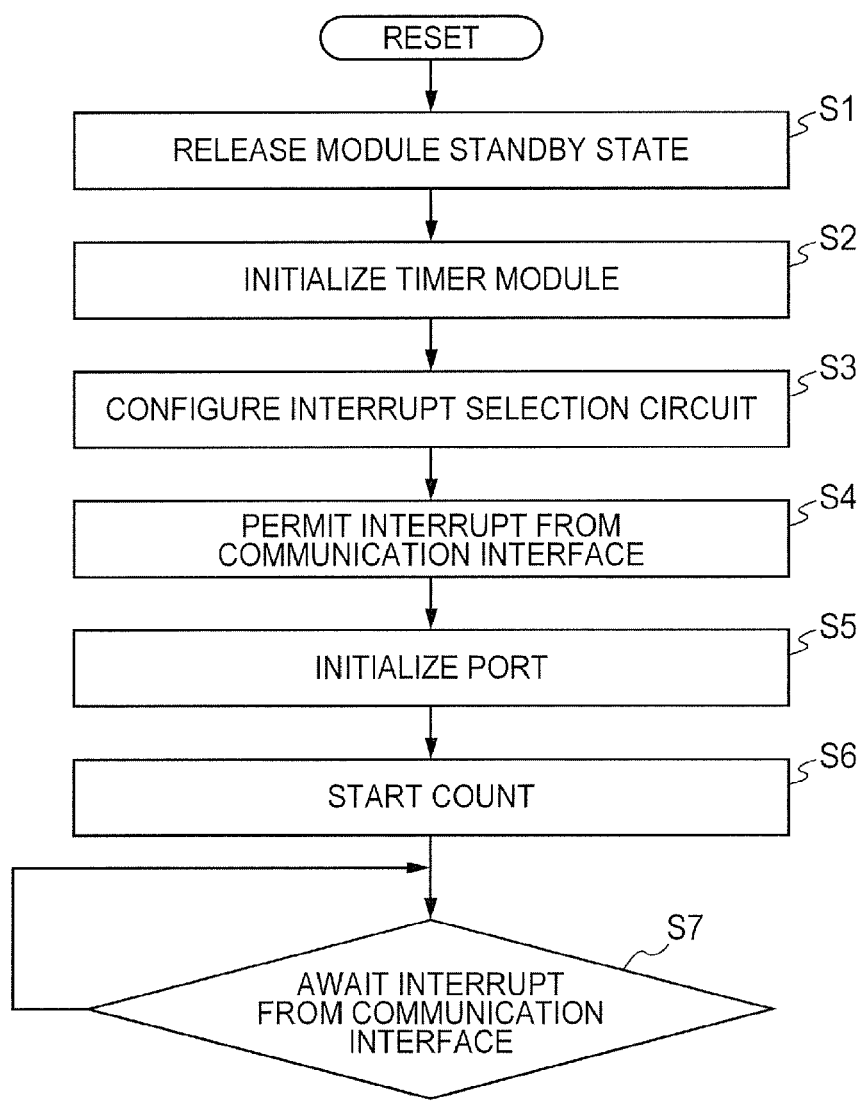
FIG. 8 is a flowchart illustrating a reset routine for the microcomputer according to the second embodiment.

The following describes an initialization operation for the microcomputer to control motors using 3-phase complementary PWM output. FIG. 8 is a flowchart illustrating a reset routine for the microcomputer according to the second embodiment.

A reset is input to start the microcomputer. The microcomputer then releases the timer modules 4_1 and 4_2 and the communication interface 3 from a module standby state (S1).

The microcomputer initializes the timer module 4_1 (S2). The microcomputer assigns the dead time to timer counter TCNT1 and 0 to timer counter TCNT2. The microcomputer assigns parameters TthA, TthB, and TthC to buffer registers TBRA(22_A), TBRB(22_B), and TBRC(22_C), respectively. Parameters TthA, TthB, and TthC specify duties for U-phase, V-phase, and W-phase, respectively. The microcomputer assigns the same parameters TthA, TthB, and TthC to the compare registers TCRA(21_A), TCRB(21_B), and TCRC(21_C) and assigns the dead time to dead time register TDDR. In the reset routine, the CPU 2 directly assigns initial values to the compare register 21 and the dead time register 25. The CPU 2 requires no subsequent update. If the timer module 4_1 is a general-purpose one, the microcomputer configures settings to allow buffer registers TBRA(22_A), TBRB(22_B), and TBRC(22_C) to correspond to compare registers TCRA(21_A), TCRB(21_B), and TCRC(21_C). The microcomputer configures settings to enable output from TU1_UP, TU1_UN, TU1_VP, TU1_VN, TU1_WP, and TU1_WN.

After the timer module 4_1 is initialized as described above, the microcomputer enables parameter transfer for the timer module 4_1 based on a timer interrupt from the communication interface 3 (S3). The microcomputer assigns an effective priority to the CPU interrupt from the communication interface 3 (S4). The microcomputer initializes a port 8_1 as output coupled to the three-phase complementary PWM control signals TU1_UP, TU1_UN, TU1_VP, TU1_VN, TU1_WP, and TU1_WN (S5). The microcomputer starts counting timer counters TCNT1 and TCNT2 (S6). The microcomputer awaits CPU interrupt INT_C from the communication interface 3 (S7).

The following describes microcomputer processes for the CPU interrupt routine and the timer interrupt. After the above-mentioned initialization, the microcomputer awaits CPU interrupt INT_C and timer interrupt INT_T. When CPU interrupt INT_C occurs, the CPU 2 executes the CPU interrupt routine. The timer module 4_1 executes a specified process.

Figure 9:
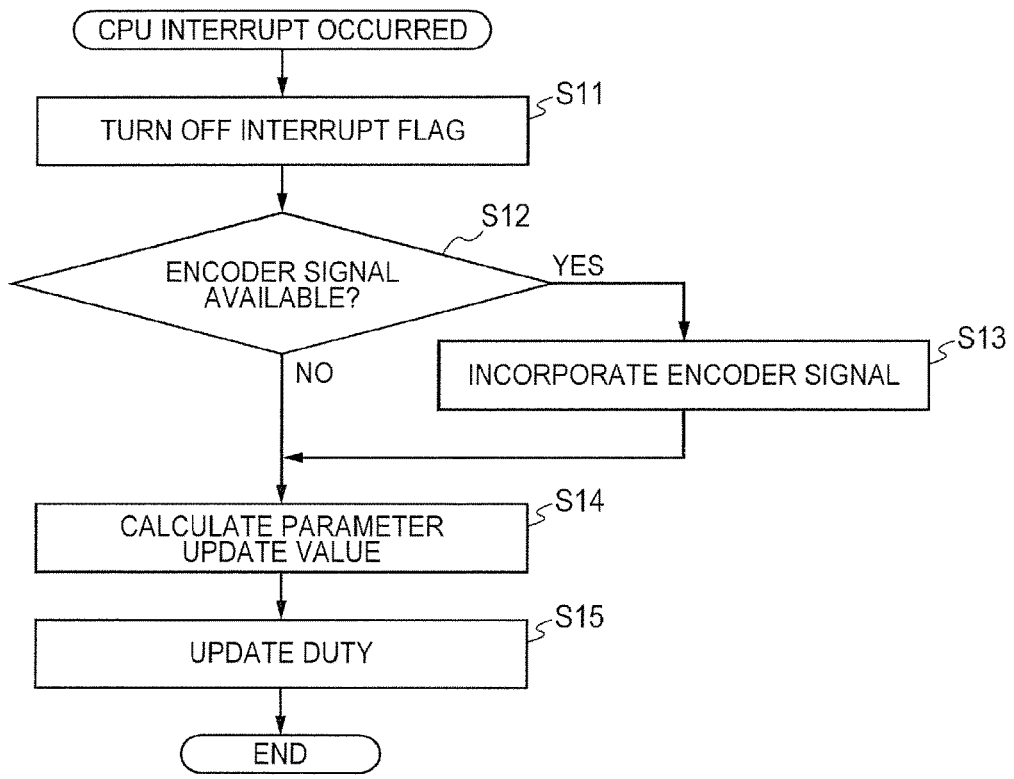
FIG. 9 is a flowchart illustrating a CPU interrupt routine for the microcomputer according to the second embodiment.

FIG. 9 is a flowchart illustrating the CPU interrupt routine for the microcomputer according to the second embodiment. When CPU interrupt INT_C from the communication interface 3 occurs, the CPU 2 clears an interrupt flag from the communication interface 3 (S11). The CPU 2 determines whether the AC motor 93_1 supplies an encoder signal (S12). If the encoder signal is supplied, the CPU 2 incorporates the encoder signal from the encoder signal input portion 19 (S13). The CPU 2 uses the parameter update program to calculate duties to be updated for U-phase, V-phase, and W-phase and calculate the corresponding parameters TthA, TthB, and TthC (S14). If incorporating the encoder signal at S13, the CPU 2 adds the value to the parameters for the duty calculation. The CPU 2 assigns parameters TthA, TthB, and TthC calculated at S14 to buffer registers TBRA(22_A), TBRB(22_B), and TBRC(22_C) of the timer module 4_1 to configure values of duties to be updated next (S15).

Figure 10:
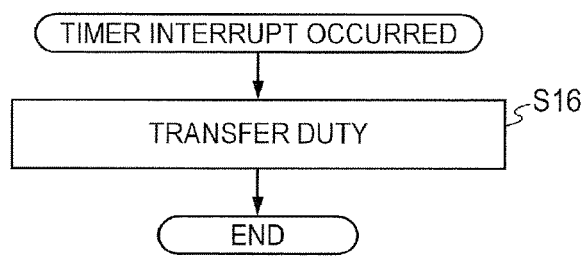
FIG. 10 is a flowchart illustrating a process in response to a timer interrupt for the microcomputer according to the second embodiment.

FIG. 10 is a flowchart illustrating a process in response to a timer interrupt for the microcomputer according to the second embodiment. When timer interrupt INT_T occurs from communication interface 3, parameters TthA, TthB, and TthC assigned to buffer registers TBRA(22_A), TBRB(22_B), and TBRC(22_C) of the timer module 4_1 are transferred to compare registers TCRA(21_A), TCRB(21_B), and TCRC(21_C), respectively (S16). Updating the values of the compare registers TCRA(21_A), TCRB(21_B), and TCRC(21_C) changes duties of the output three-phase complementary PWM control signals TU1_UP, TU1_UN, TU1_VP, TU1_VN, TU1_WP, and TU1_WN.

After CPU interrupt INT_C occurs, as described with reference to FIG. 9, the times for the CPU 2 to calculate and write update values TthA2, TthB2, and TthC2 vary with an overhead due to the CPU interrupt and the time to execute the parameter update program. After timer interrupt INT_T occurs, the time for the timer module 4_1 to update values of compare registers TCRA(21_A), TCRB(21_B), and TCRC(21_C) follows timer interrupt INT_T after a delay within several clock cycles and highly accurately synchronizes with timer interrupt INT_T. The time to generate timer interrupt INT_T is highly accurately synchronized among slave devices. Therefore, it is also possible to highly accurately synchronize the time to update values of the compare register TCRA(21_A), TCRB(21_B), and TCRC(21_C) among slave devices.

While there has been described the method of controlling the AC motor 93_1 using the timer module 4_1, the same method controls the AC motor 93_2 using the timer module 4_2 and a description is omitted for simplicity. The two AC motors 93_1 and 93_2 are controlled in highly accurate synchronization with AC motors and other external apparatuses controlled by the other slave devices.

The highly accurate synchronization and delay time can be ensured for the parameter correction time without being affected by overheads due to CPU interrupts and variations in the time to execute the parameter update program. Consequently, externally coupled devices (motors) can be operated based on the highly accurate time synchronization.

Third Embodiment

Figure 11:
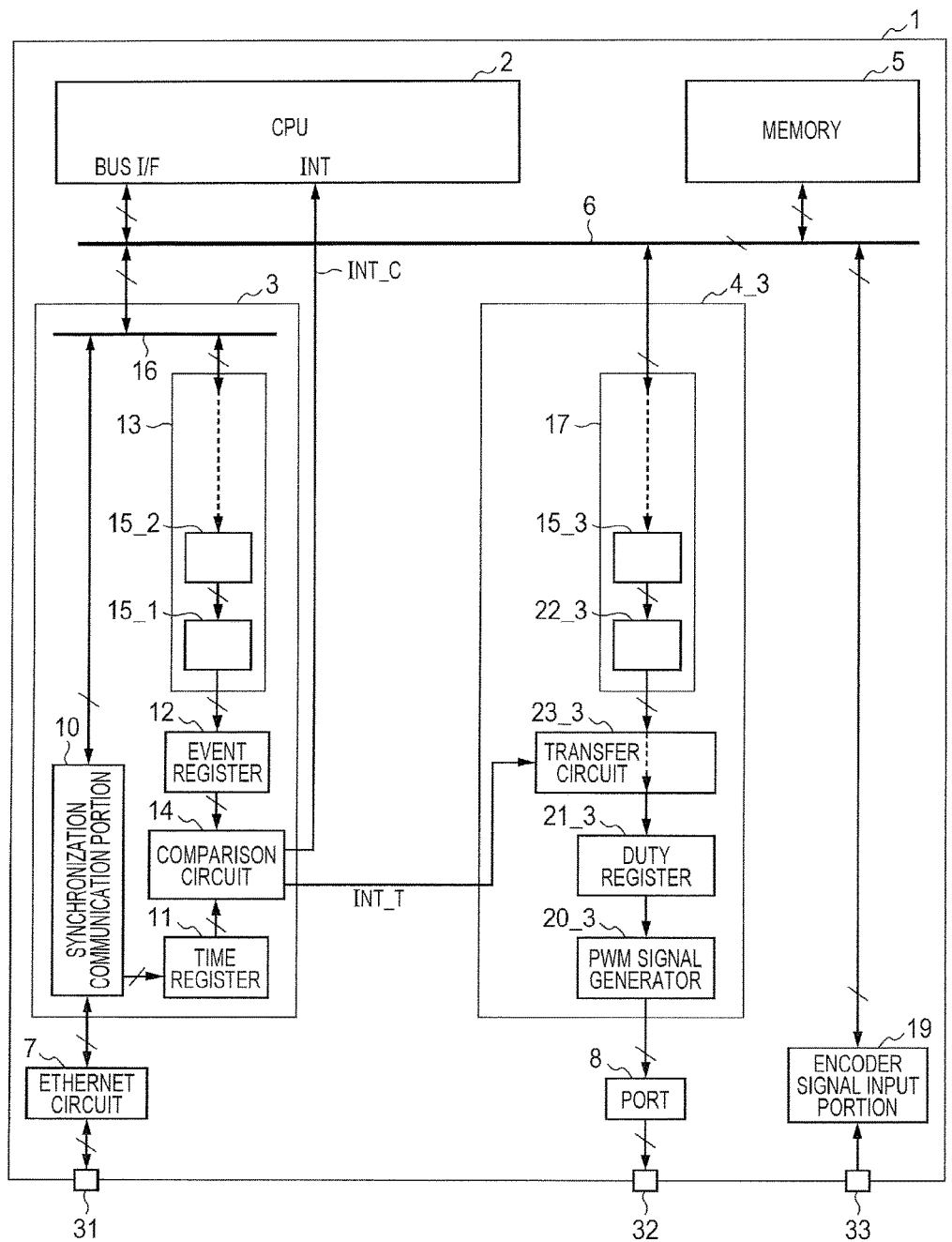
FIG. 11 is a block diagram illustrating a configuration of a microcomputer according to a third embodiment.

FIG. 11 is a block diagram illustrating a configuration of a microcomputer according to a third embodiment. The microcomputer according to the second embodiment includes the timer modules 4_1 and 4_2 as the two peripheral modules 4. On the other hand, the microcomputer according to the third embodiment includes one peripheral module 4_3 that includes a PWM signal generator 20_3. Unlike the timers 20_1 and 20_2, the PWM signal generator 20_3 is directly supplied with a duty value to generate a PWM-controlled control signal and outputs it from a terminal 32 of the microcomputer 1 via the port 8. The CPU 2, the communication interface 3, the memory 5, and the encoder 19 are configured similarly to those of the microcomputer according to the second embodiment. However, peripheral module interrupt INT_T output from the communication interface 3 is directly input to the peripheral module 4_3 without using the interrupt selection circuit 9.

The peripheral module 4_3 includes a PWM generator circuit 20_3, a duty buffer 17, a duty register 21_3, and a transfer circuit 23_3. The duty buffer 17 includes registers 22_3, 15_, and so on. For example, the duty buffer 17 includes FIFO shift registers. When the CPU 2 writes duty values from the bus 6, the duty buffer 17 transfers and outputs the duty values in the order in which the duty values were written. When receiving peripheral module interrupt INT_T, the transfer circuit 23_3 transfers the duty values to the duty register 21_3 from the last register 22_3 in the duty buffer 17. The duty buffer 17 sequentially shifts the duty values held in it. The last register 22_3 in the duty buffer 17 corresponds to the buffer register 22 according to the first and second embodiments. The PWM signal generator 20_3 generates a control signal for the duty whose duty value is held in the duty register 21_3.

The duty buffer 17 can alleviate limitations on timings for the CPU 2 to write duty values to the peripheral module 4_3.

Figure 12:
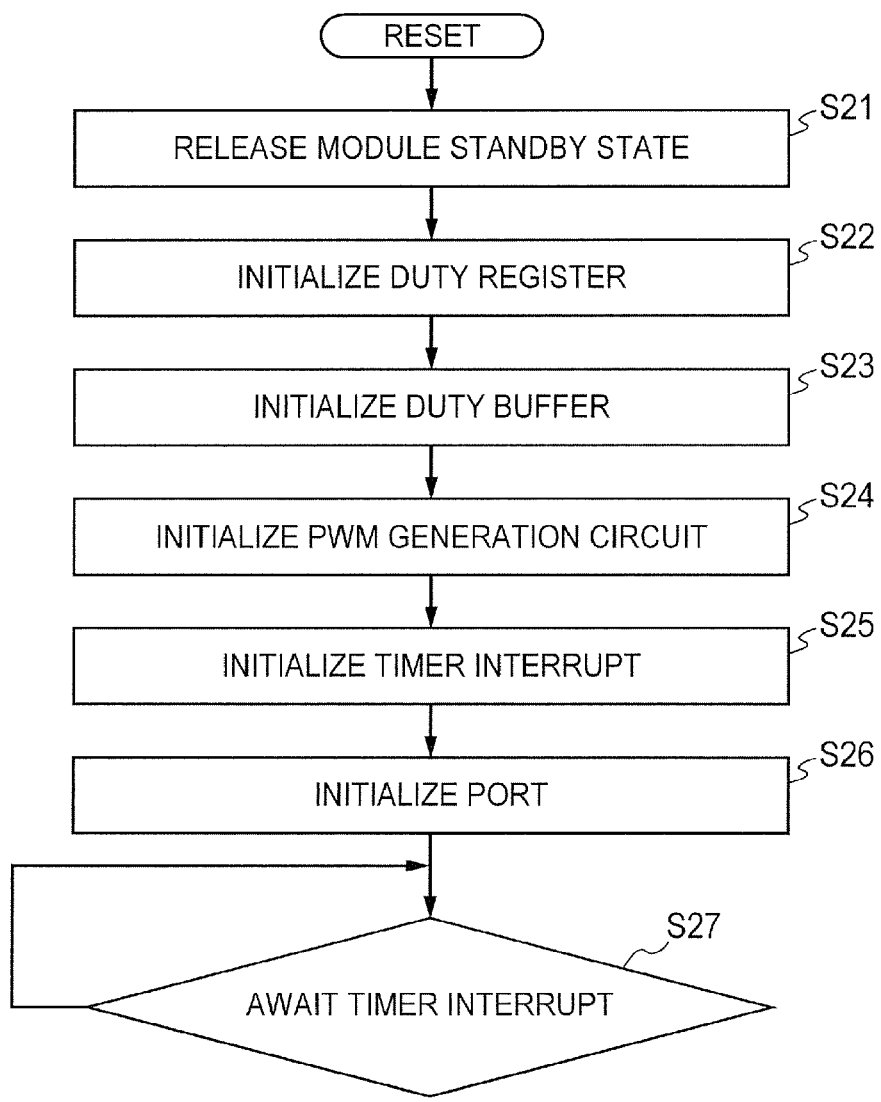
FIG. 12 is a flowchart illustrating a reset routine for the microcomputer according to the third embodiment.

The following describes an initialization operation on the microcomputer. FIG. 12 is a flowchart illustrating a reset routine for the microcomputer according to the third embodiment.

A reset is input to start the microcomputer. The microcomputer then releases the peripheral module 4_3 and the communication interface 3 from a module standby state (S21). The microcomputer initializes the duty register 21_3 (S22). While FIG. 11 illustrates the duty register 21_3 for one system, the microcomputer includes three duty registers 21_3 for three systems corresponding to U-phase, V-phase, and W-phase. At S22, the microcomputer supplies the duty registers with appropriate initial values. The microcomputer supplies the duty buffer 17 with U-phase, V-phase, and W-phase duty update values (S23). The microcomputer supplies the PWM generator circuit 20_3 with a parameter such as the dead time needed for 3-phase complementary PWM generation (S24). The microcomputer initializes the timer interrupt to update the PWM duty each the timer interrupt occurs (S25). The microcomputer configures the port 8 as U-phase, V-phase, and W-phase output (S26). The microcomputer awaits the timer interrupt (S27).

Figure 13:
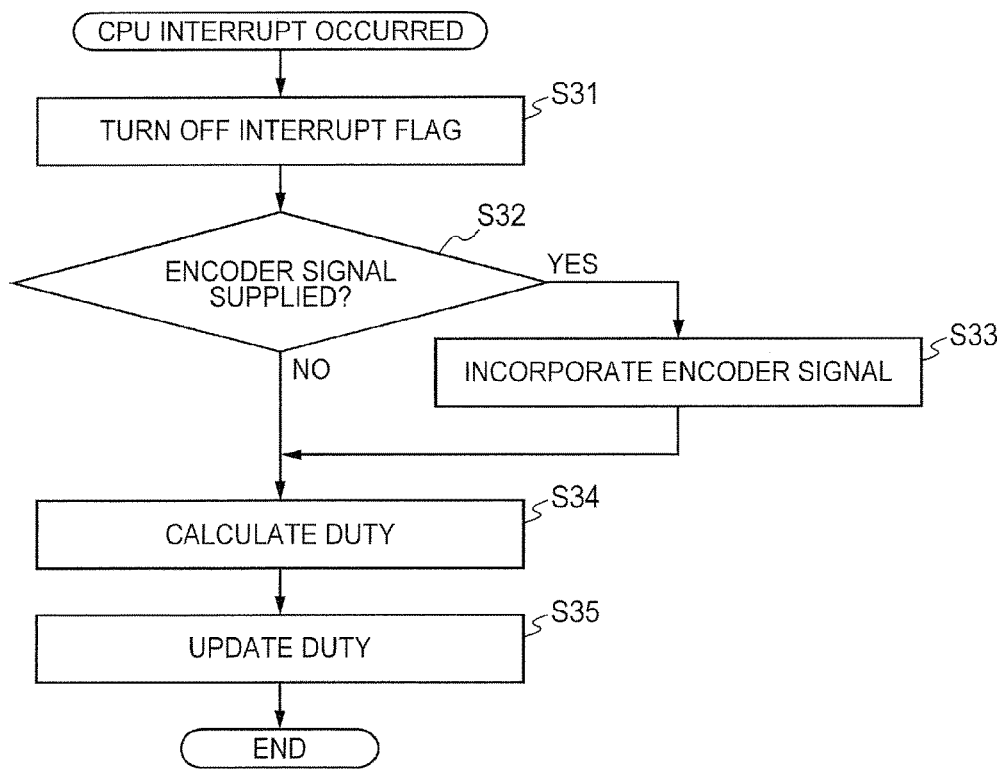
FIG. 13 is a flowchart illustrating a CPU interrupt routine for the microcomputer according to the third embodiment.

FIG. 13 is a flowchart illustrating a CPU interrupt routine for the microcomputer according to the third embodiment. When CPU interrupt INT_C from the communication interface 3 occurs, the CPU 2 clears an interrupt flag from the communication interface 3 (S31). The CPU 2 determines whether the encoder signal input portion 19 supplies an encoder signal (S32). If the encoder signal is supplied, the CPU 2 incorporates the encoder signal from the encoder signal input portion 19 (S33). The microcomputer calculates the duty (S34). The microcomputer adds the value of the encoder signal incorporated at S33 to the parameter during the duty calculation. The microcomputer supplies the duty buffer 17 with the duty calculated at S34 to update the duty (S35).

Figure 14:
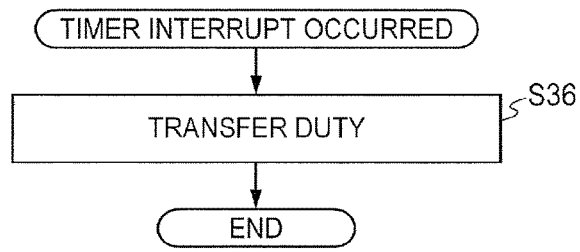
FIG. 14 is a flowchart illustrating a process in response to a timer interrupt for the microcomputer according to the third embodiment.

FIG. 14 is a flowchart illustrating a process in response to a timer interrupt for the microcomputer according to the third embodiment. When timer interrupt INT_T occurs from communication interface 3, the transfer circuit 23_3 transfers a duty placed in the duty buffer 17 to the duty register 20_3.

The highly accurate synchronization and delay time can be ensured for the parameter correction time without being affected by overheads due to CPU interrupts and variations in the time to execute the parameter update program. Consequently, externally coupled devices (motors) can be operated based on the highly accurate time synchronization. It is also possible to alleviate limitations on timings for the CPU 2 to write duty values to the peripheral module 4_3.

Fourth Embodiment

Figure 15:
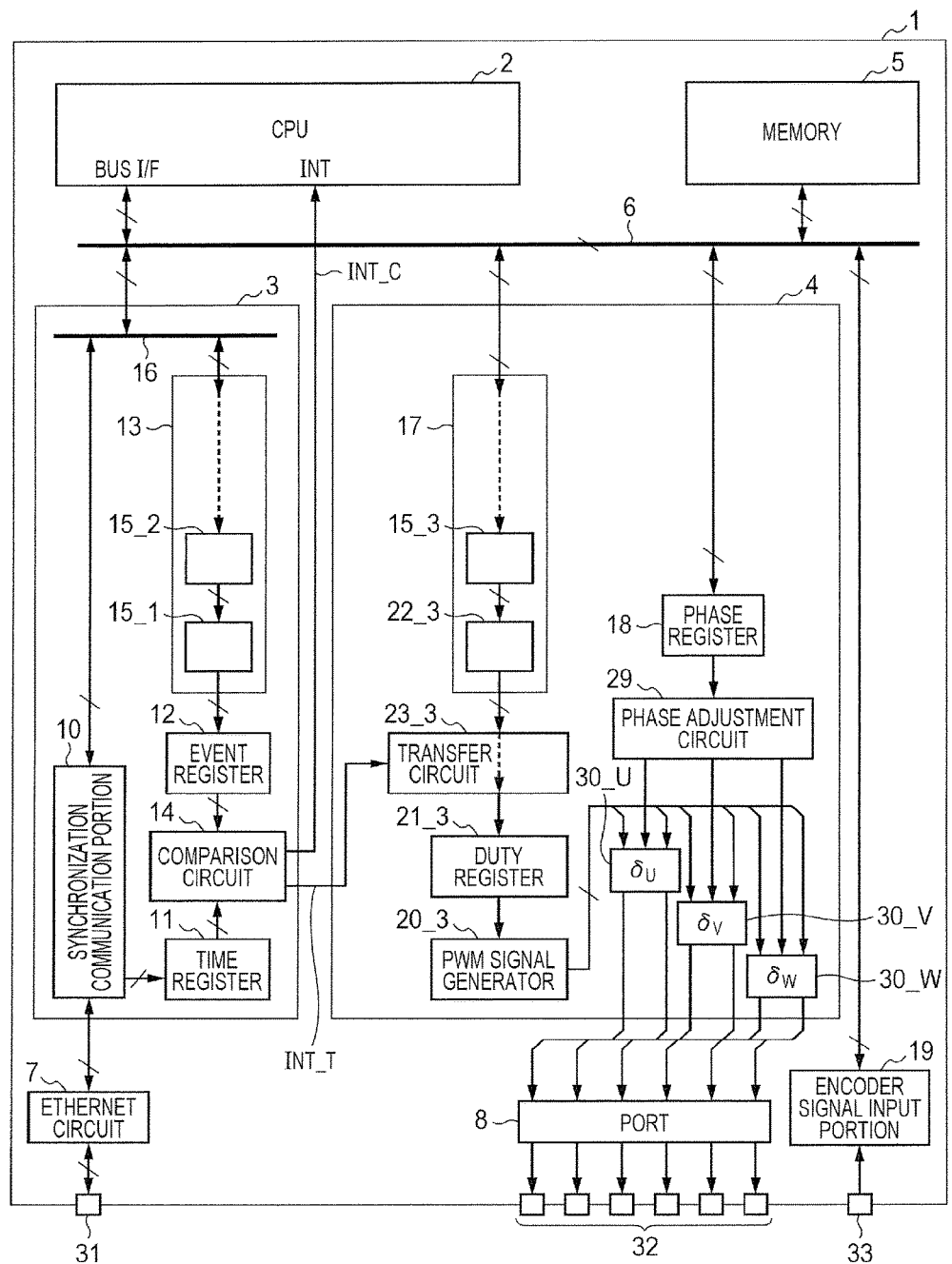
FIG. 15 is a block diagram illustrating a configuration of a microcomputer according to a fourth embodiment.

FIG. 15 is a block diagram illustrating a configuration of a microcomputer according to a fourth embodiment. Compared to the microcomputer according to the third embodiment as illustrated in FIG. 11, the microcomputer according to the fourth embodiment further includes variable delay circuits 30_U, 30_V, and 30_W, a phase adjustment circuit 29, and a phase register 18 subsequent to the PWM signal generator 20_3. The variable delay circuits 30_U, 30_V, and 30_W correspond to U-phase, V-phase, and W-phase outputs, respectively. The phase adjustment circuit 29 controls the variable delay circuits. The phase register 18 supplies the phase adjustment circuit 29 with U-phase, V-phase, and W-phase.

Figure 16:
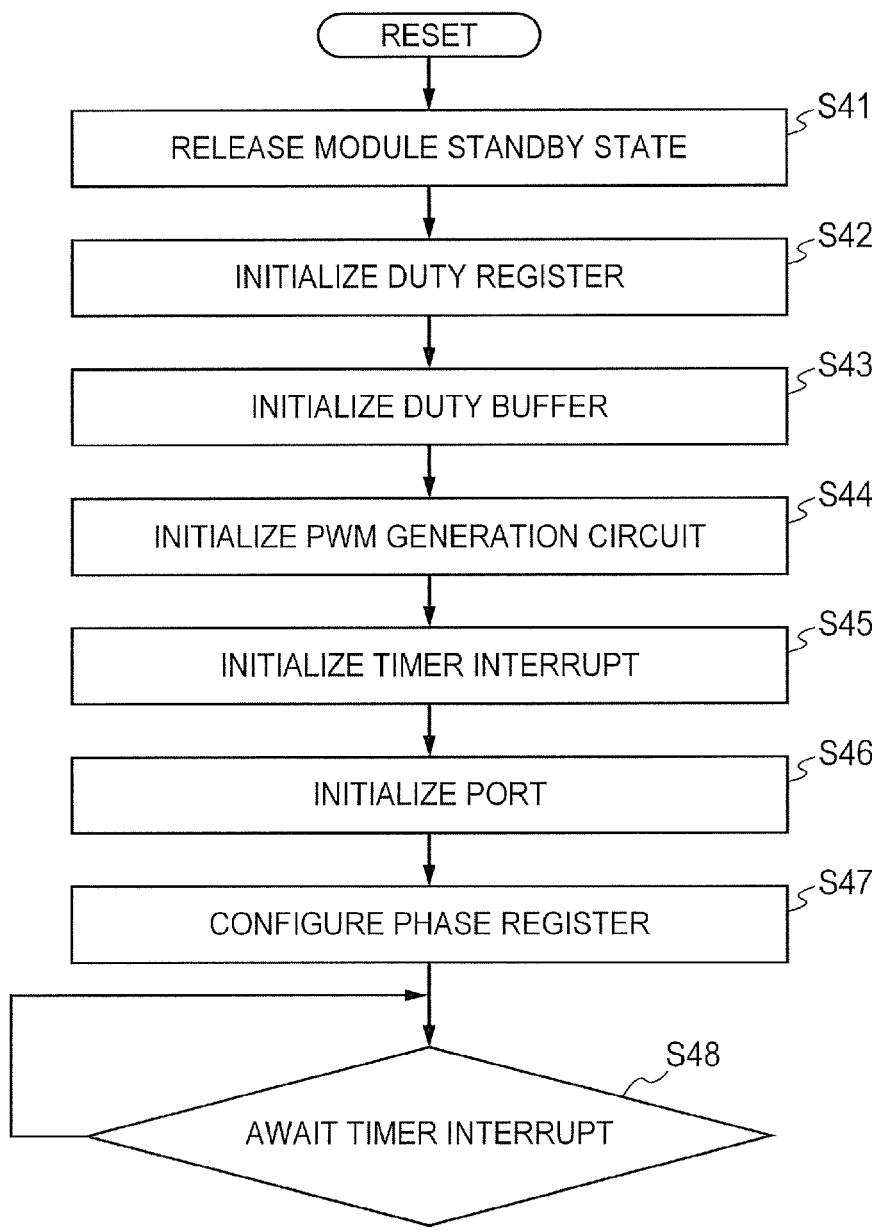
FIG. 16 is a flowchart illustrating a reset routine for the microcomputer according to the fourth embodiment.

FIG. 16 is a flowchart illustrating a reset routine for the microcomputer according to the fourth embodiment. S41 through S46 are equal to S21 through S26 in FIG. 12 and a description is omitted for simplicity. Following S46, the microcomputer configures the phase register (S47). The microcomputer supplies variable delay circuits 30_U, 30_V, and 30_W with delay amounts δ(0), δ(1), and δ(2). After completing all initialization settings, the microcomputer awaits timer interrupt INT_T (S48). After the initialization, the microcomputer operates in response to the CPU interrupt from the communication interface 3 and the timer interrupt similarly to the third embodiment described with reference to FIGS. 13 and 14 and a description is omitted for simplicity.

Delays are independently supplied to U-phase, V-phase, and W-phase control signals output from the PWM signal generator 20_3, making it possible to configure the phase relationship among U-phase, V-phase, and W-phase. This enables synchronization control over external apparatuses such as motors that require phase adjustment.

On the other hand, the microcomputer may be configured so that the PWM signal generator 20_3 generates only one system of a PWM control signal. The variable delay circuits 30_U, 30_V, 30_W each may have a phase difference of 120 degrees basically. This can limit the duty buffer 17, the transfer circuit 23_3, and the duty register 21_3 to only one system.

Fifth Embodiment

Figure 17:
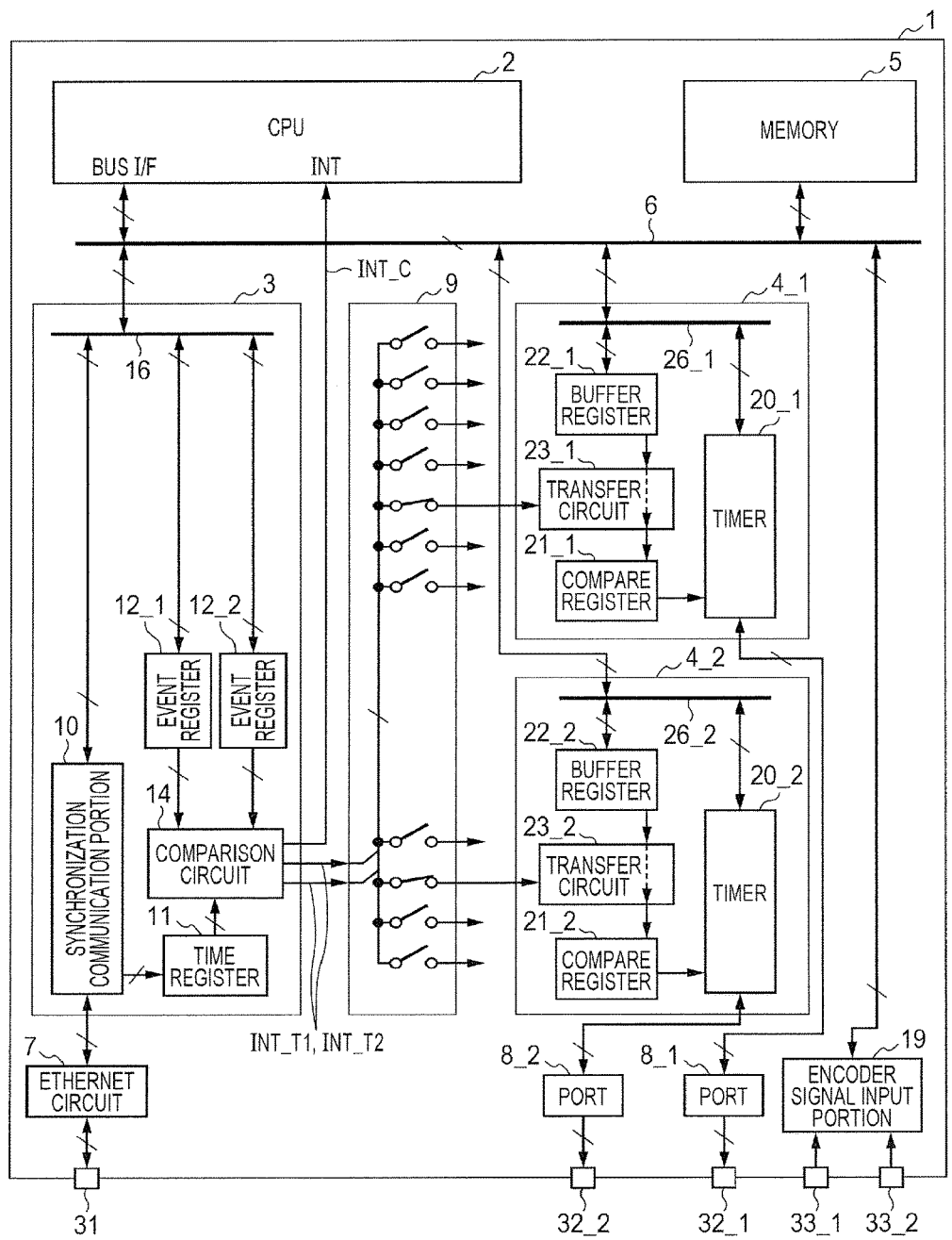
FIG. 17 is a block diagram illustrating a configuration of a microcomputer according to a fifth embodiment.

FIG. 17 is a block diagram illustrating a configuration of a microcomputer according to a fifth embodiment. The fifth embodiment simplifies the microcomputer according to the second embodiment as illustrated in FIG. 4 and provides examples of applying the microcomputer only starting industrial motors, not controlling them for correction. If multiple motors are started simultaneously, the timer module 4_1 controls the first motor. The timer module 4_2 controls the second motor. The communication interface 3 includes two event registers 12_1 and 12_2 as well as the synchronization communication portion 10, the time register 11, and the comparison circuit 14. For example, the communication interface 3 processes protocols of the synchronous Ethernet compliant with the IEEE1588 standard. The comparison circuit 14 compares the local time stored in the time register 11 with times stored in the event registers 12_1 and 12_2. If the local time matches any time, the comparison circuit 14 issues interrupt INT_C. If the local time matches the event registers 12_1 and 12_2, the comparison circuit 14 issues timer interrupts INT_T1 and INT_T2, respectively. Timer interrupts INT_T1 and INT_T2 are selected so that the interrupt selection circuit 9 supplies them to the timer modules 4_1 and 4_2, respectively. The CPU 2, the memory 5, the bus 6, the Ethernet circuit 7, the timer modules 4_1 and 4_2, the ports 8_1 and 8_2, and the encoder signal input portion 19 are configured similarly to those of the microcomputer according to the second embodiment as illustrated in FIG. 4.

The following describes the embodiment to start industrial motors at predetermined start times (tstart(0) and tstart(1)) in a system that provides time synchronization between industrial apparatuses using the synchronous Ethernet. The start times (tstart(0) and tstart(1)) are previously written to the memory 5 or are acquired from the outside via the synchronization communication portion 10 according to the Ethernet communication and are stored in the memory 5. The CPU 2 uses a CPU core that emphasizes the operation performance suited for motor control. The CPU 2 incorporates control parameters such as an angular velocity, torque, and a phase via the encoder, performs calculation to correct duties, and configures parameters in order to output specified duties to the timer modules 4_1 and 4_2. The CPU 2 stores the acquired start times tstart(0) and tstart(1) in the event registers 12_1 and 12_2 corresponding to the motors to be started. For example, suppose the first motor to start at start time tstart(0) and the second motor to start at start time tstart(1). Then, the CPU 2 writes start time tstart(0) to the event register 12_1 corresponding to the first motor and writes start time tstart(1) to the event register 12_2 corresponding to the second motor. The comparison circuit 14 compares the start times in the event registers 12_1 and 12_2 with the local time in the time register 11. If they match, the comparison circuit 14 generates CPU interrupt INT_C and timer interrupts INT_T1 and INT_T2. The interrupt selection circuit 9 couples timer interrupts INT_T1 and INT_T2 with the timer modules 4_1 and 4_2, respectively. The timer modules 4_1 and 4_2 generate control signals for duties specified by the input parameters. The generated control signals are supplied to an inverter as an external apparatus via the ports 8_1 and 8_2. The inverter then drives the motors. For example, a 3-phase complementary PWM signal drives the motors. This signal is generally used for industrial motors and includes three normal and reverse phases. Angular velocities and positional information about the motors are incorporated as encoder signals from the encoder signal input portion 19.

Figure 18:
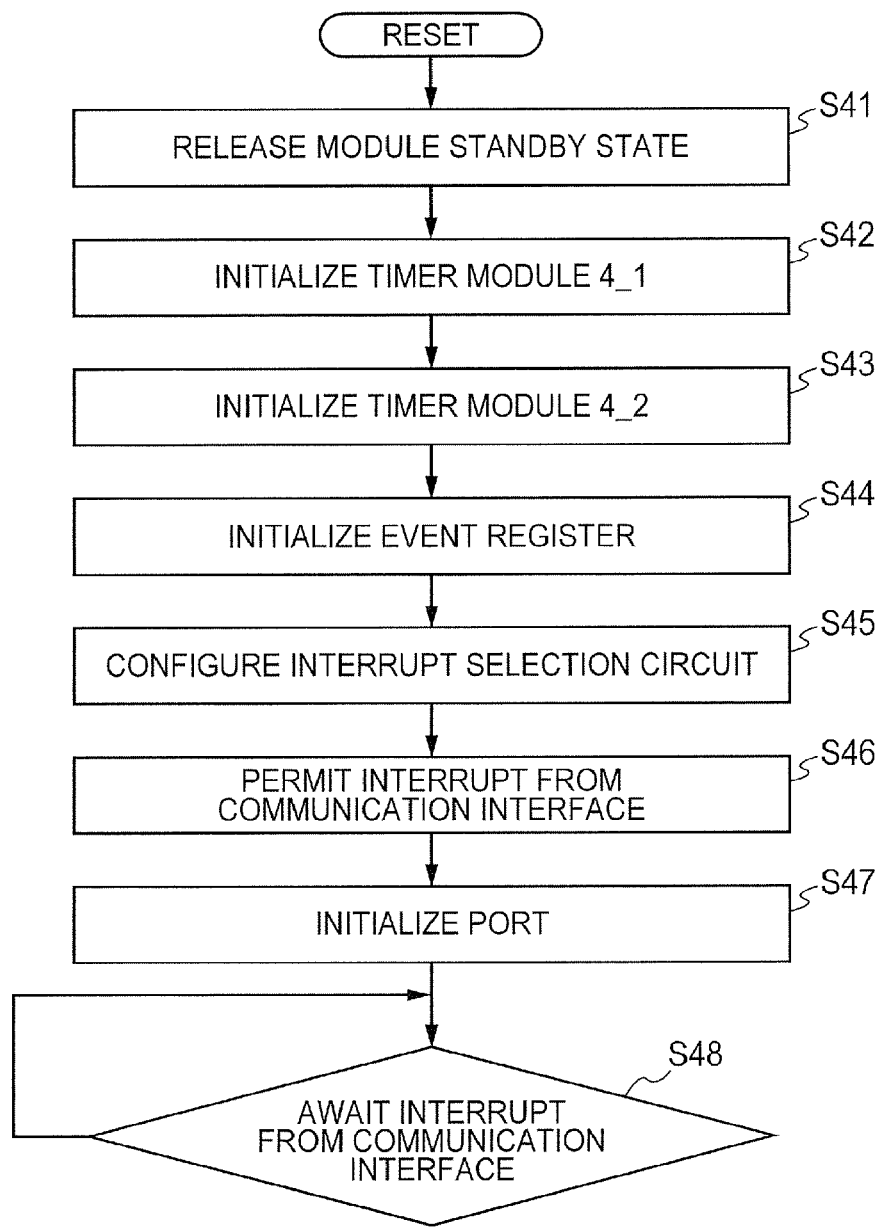
FIG. 18 is a flowchart illustrating a reset routine for the microcomputer according to the fifth embodiment.

The following describes an initialization operation on the microcomputer that controls motors using 3-phase complementary PWM outputs. FIG. 18 is a flowchart illustrating a reset routine for the microcomputer according to the fifth embodiment.

A reset is input to start the microcomputer. The microcomputer then releases the timer modules 4_1 and 4_2 and the communication interface 3 from a module standby state (S41). To initialize the timer module 4_1, the microcomputer initializes parameters to specify duties, sets the dead time, and configures waveform output (S42). To initialize the timer module 4_2, the microcomputer similarly initializes parameters to specify duties, sets the dead time, and configures waveform output (S43). The microcomputer assigns start time tstart(0) for the timer module 4_1 to the event register 12_1. The microcomputer assigns start time tstart(1) for the timer module 4_2 to the event register 12_1. The microcomputer couples timer interrupts INT_T1 and INT_T2 from the communication interface 3 to the timer modules 4_1 and 4_2 and enables the timer interrupts (S45). The microcomputer assigns an effective priority to the CPU interrupt from the communication interface 3 (S46). The microcomputer specifies the ports 8_1 and 8_2 as outputs (S47). Three-phase complementary PWM control signals output from the timer modules 4_1 and 4_2 are coupled to the ports 8_1 and 8_2. The microcomputer awaits CPU interrupt INT_C from the communication interface 3 (S48).

Figure 19:
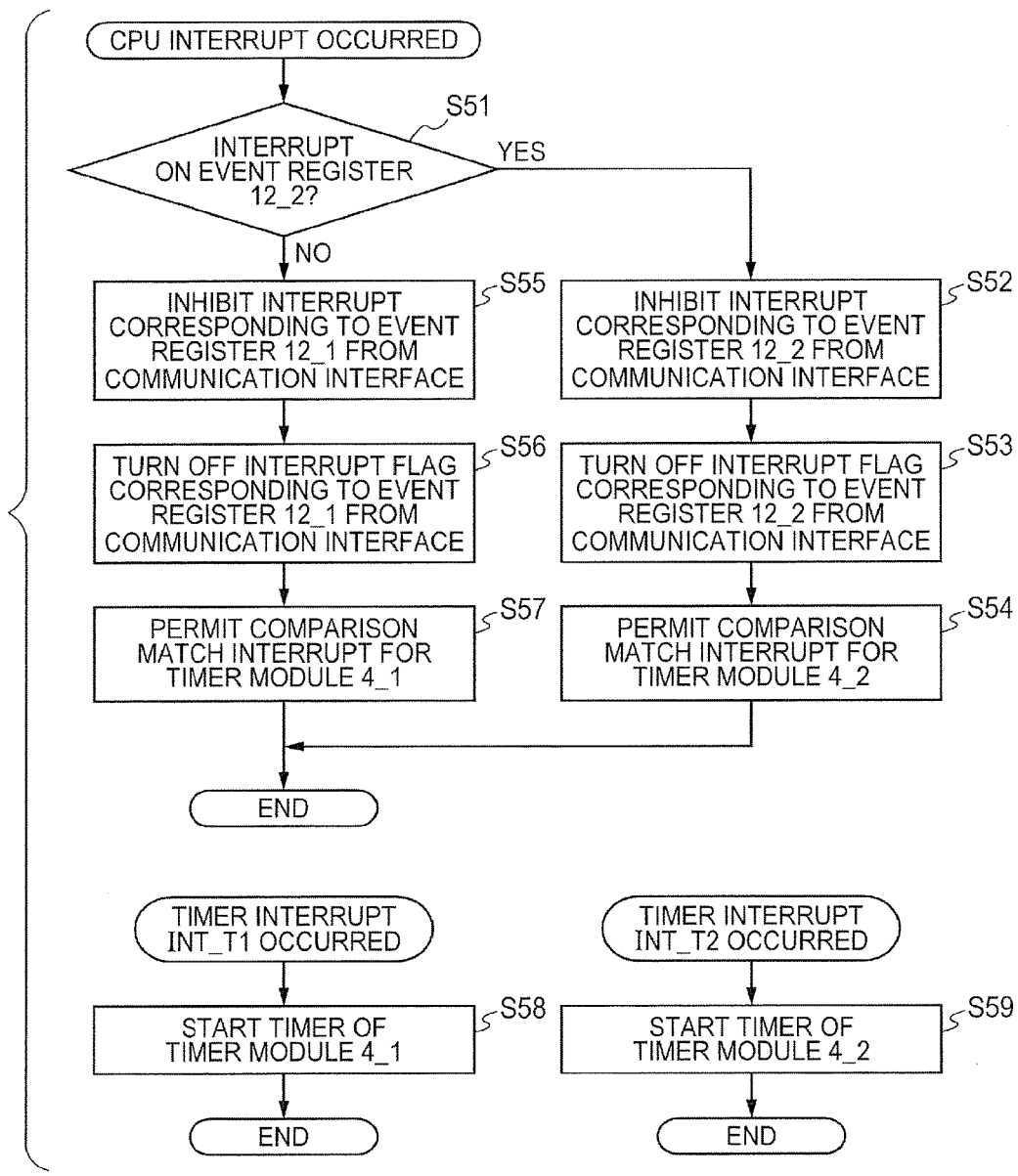
FIG. 19 provides flowcharts illustrating a CPU interrupt routine and processes in response to timer interrupts for the microcomputer according to the fifth embodiment.

The following describes microcomputer processes for the CPU interrupt routine and the timer interrupt. After the above-mentioned initialization, the microcomputer awaits CPU interrupt INT_C and timer interrupts INT_T1 and INT_T2. When CPU interrupt INT_C occurs, the CPU 2 executes the CPU interrupt routine. When timer interrupts INT_T1 and INT_T2 occur, the timer modules 4_1 and 4_2 perform specified processes. FIG. 19 provides flowcharts illustrating a CPU interrupt routine and processes in response to timer interrupts for the microcomputer according to the fifth embodiment. When CPU interrupt INT_C occurs from the communication interface 3, the CPU 2 determines an interrupt cause (S51). At S51, the interrupt cause may correspond to the event register 12_2. In this case, the CPU 2 inhibits the interrupt corresponding to the event register 12_2 (S52). The CPU 2 turns off an interrupt flag corresponding to the event register 12_2 (S53). The CPU 2 permits a comparison match interrupt for the timer module 4_2 and enables the duty correction (S54). At S51, the interrupt cause may correspond to the event register 12_1. In this case, the CPU 2 inhibits the interrupt corresponding to the event register 12_1 (S55). The CPU 2 turns off an interrupt flag corresponding to the event register 12_1 (S56). The CPU 2 permits a comparison match interrupt for the timer module 4_1 and enables the duty correction (S57).

The CPU 2 starts a timer of the timer module 4_1 when timer interrupt INT_T1 corresponding to the event register 12_1 occurs from the communication interface 3 (S58). The CPU 2 starts a timer of the timer module 4_2 when timer interrupt INT_T2 corresponding to the event register 12_2 occurs from the communication interface 3 (S59).

Figure 20:
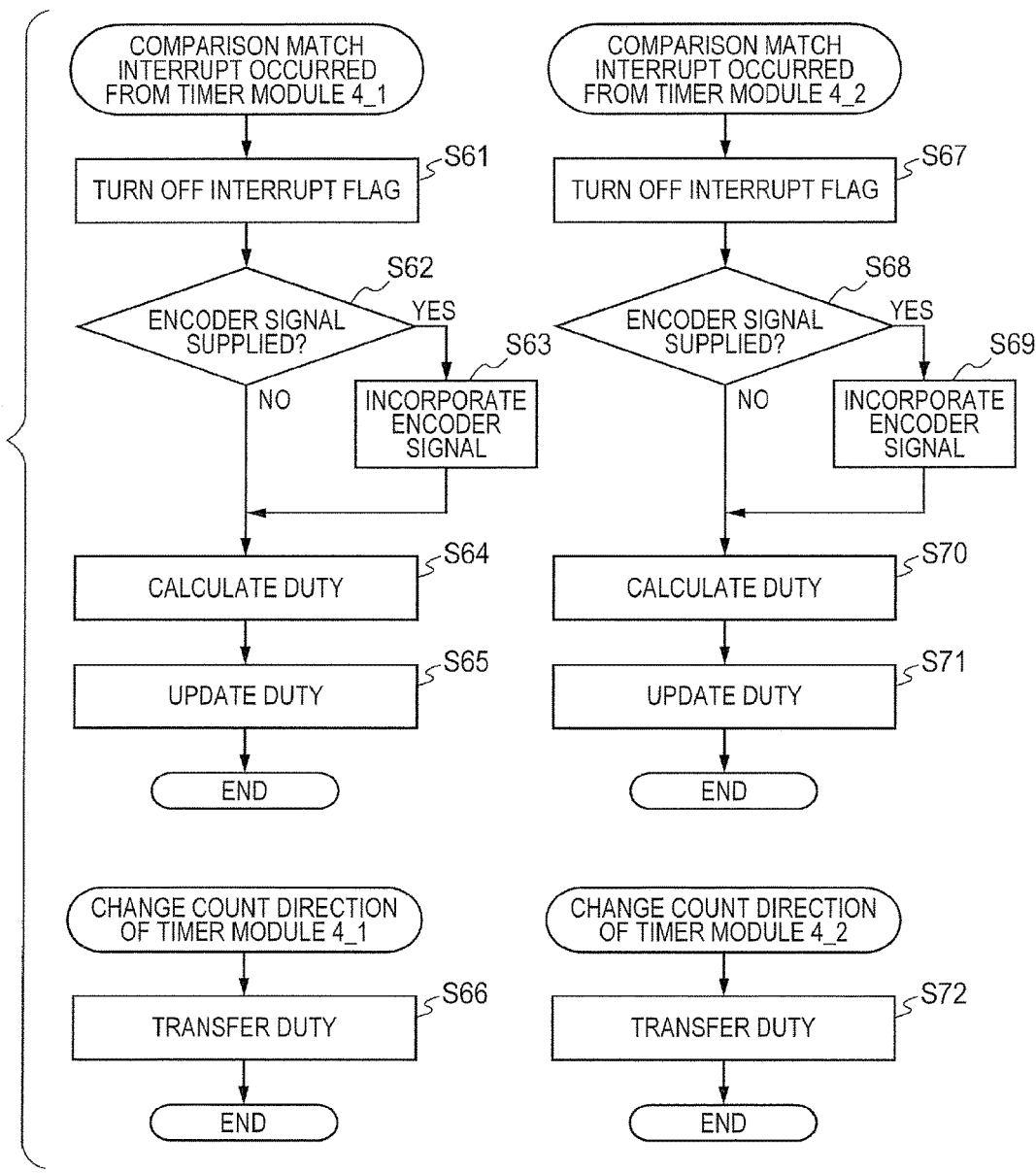
FIG. 20 provides flowcharts illustrating compare match interrupt routines and processes in response to changes of count directions in counters for the microcomputer according to the fifth embodiment.

FIG. 20 provides flowcharts illustrating compare match interrupt routines and processes in response to changes of count directions in counters for the microcomputer according to the fifth embodiment. The CPU 2 turns off a comparison match interrupt flag of the timer module 4_1 when a comparison match interrupt occurs from the timer module 4_1 (S61). The CPU 2 determines whether an encoder signal is input (S62). If an encoder signal is input, the CPU 2 incorporates it from the encoder signal input portion 19 (S63). The CPU 2 calculates a duty (S64). If the encoder signal is incorporated at S63, the CPU 2 adds its value to a parameter for the duty calculation. The CPU 2 updates the duty by supplying the buffer register 22_1 for the timer module 4_1 with a parameter to output the calculated duty (S65). The count direction of the counter (timer) 20_1 for the timer module 4_1 changes from increment to decrement or vice versa. Then, a transfer circuit 23_1 transfers a duty specification parameter to the compare register 21_1 for the timer module 4_1. The duty specification parameter is already supplied to the buffer register for the timer module 4_1. The CPU 2 turns off a comparison match interrupt flag of the timer module 4_2 when a comparison match interrupt occurs from the timer module 4_2 (S67). The CPU 2 determines whether an encoder signal is input (S68). If an encoder signal is input, the CPU 2 incorporates it from the encoder signal input portion 19 (S69). The CPU 2 calculates a duty (S70). If the encoder signal is incorporated at S63, the CPU 2 adds its value to a parameter for the duty calculation. The CPU 2 updates the duty by supplying the buffer register 22_2 for the timer module 4_2 with a parameter to output the calculated duty (S71). The count direction of the counter (timer) 20_2 for the timer module 4_2 changes from increment to decrement or vice versa. Then, a transfer circuit 23_2 transfers a duty specification parameter to the compare register 21_2 for the timer module 4_2 (S72). The duty specification parameter is already supplied to the buffer register for the timer module 4_2.

This enables to independently supply correction times for parameters to start and control external apparatuses and provide more highly accurate and versatile synchronization control.

While there have been described specific preferred embodiments of the present invention, it is to be distinctly understood that the present invention is not limited thereto but may be otherwise variously embodied within the spirit and scope of the invention.

For example, basic parts of a microcomputer such as the CPU 2, the memory 5, and the bus 6 may conform to any processor architecture. The CPU 2 may be available as any processor including a multiprocessor. The bus 6 may be hierarchized to include cache memory or a memory management unit. The memory 5 may be available on-chip or as ROM, RAM, or a combination thereof.

What is claimed is:

1. A method carried out by a microcomputer including a CPU, a first register and a second register, to generate an operation control signal to control operation of an external apparatus based on an operation control parameter, comprising the steps of:
 (a) communicating with other devices via a network;
 (b) synchronizing a first time and a second time with the other devices based on communication via the network;
 (c) comparing the first time with the second time;
 (d) transferring an update value stored in the second register to the first register that stores a current value of the operation control parameter based on a result of the comparison of the first time with the second time;
 (e) generating the operation control signal to control operation of the external apparatus based on the current value of the operation control parameter; and
 (f) calculating another update value of the operation control parameter based on the result of the comparison of the first time with the second time,
 wherein the operation control signal is a pulse-width modulated control signal, and
 wherein the operation control parameter is a duty for the pulse width modulation.

2. The method according to claim 1,
 wherein the second time comprises a correction time,
 wherein the correction time is supplied via the network, and wherein the update value is used as the operation control parameter at the correction time.

3. The method according to claim 2, further comprising the step of:
(g) holding a plural of the correction time, comparing the first time with the second time and, if a match is found, applying the correction time to the second time in the same order as the correction time is supplied.

4. The method according to claim 2,
wherein step (d) includes the step of holding a plural of the update value of the operation control parameter and updating the current value of the operation control parameter by held data in the same order as the data was calculated based on the result of the comparison of the first time with the second time.

5. The method according to claim 4,
wherein the operation control signal comprises a 3-phase control signal.

6. The method according to claim 1, further comprising the step of:
(h) holding a start time and a correction time,
wherein the start time is supplied based on communication via the network,
wherein the correction time specifies the time to update the operation control parameter from the current value to the update value, and
wherein step (d) includes the step of updating the current value of the operation control parameter by an initial value of the operation control parameter at the start time.

7. A method carried out by a microcomputer including a CPU, a first register and a second register, to generate an operation control signal to control operation of an external apparatus based on an operation control parameter, comprising the steps of:
(a) communicating with other devices via a network;
(b) synchronizing a first time and a second time with the other devices based on communication via the network;
(c) comparing the first time with the second time and, if a match is found, issue a CPU interrupt to the CPU, and issue a peripheral module interrupt to the peripheral module;
(d) transferring an update value stored in the second register to the first register that stores a current value of the operation control parameter based on the peripheral module interrupt;

(e) generating the operation control signal to control operation of the external apparatus based on the current value of the operation control parameter; and
(f) calculating another update value of the operation control parameter based on a result of the comparison of the first time with the second time,
wherein the operation control signal is a pulse-width modulated control signal, and
wherein the operation control parameter is a duty for the pulse width modulation.

8. The method according to claim 7,
wherein the second time comprises a correction time,
wherein the correction time is supplied via the network, and
wherein the update value is used as the operation control parameter at the correction time.

9. The method according to claim 8, further comprising the step of:
(g) holding a plural of the correction time, comparing the first time with the second time and, if a match is found, applying the correction time to the second time in the same order as the correction time is supplied.

10. The method according to claim 7,
wherein the peripheral module interrupt is selectable to be coupled to one of a plurality of external apparatuses.

11. The method according to claim 8,
wherein step (d) includes the step of holding a plural of the update value of the operation control parameter and updating the current value of the operation control parameter by held data in the same order as the data was calculated based on the result of the comparison of the first time with the second time.

12. The method according to claim 11,
wherein the operation control signal comprises a 3-phase control signal.

13. The method according to claim 7, further comprising the step of:
(h) holding a start time and a correction time,
wherein the start time is supplied based on communication via the network,
wherein the correction time specifies the time to update the operation control parameter from the current value to the update value, and
wherein step (d) includes the step of updating the current value of the operation control parameter by an initial value of the operation control parameter at the start time.

* * * * *